(12) United States Patent
Kamada

(10) Patent No.: US 8,228,458 B2
(45) Date of Patent: Jul. 24, 2012

(54) BACKLIGHT UNIT AND LIQUID CRYSTAL DISPLAY

(75) Inventor: Kentaro Kamada, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 503 days.

(21) Appl. No.: 12/522,365

(22) PCT Filed: Jul. 27, 2007

(86) PCT No.: PCT/JP2007/064745
§ 371 (c)(1),
(2), (4) Date: Jul. 7, 2009

(87) PCT Pub. No.: WO2008/087761
PCT Pub. Date: Jul. 24, 2008

(65) Prior Publication Data
US 2010/0045890 A1    Feb. 25, 2010

(30) Foreign Application Priority Data
Jan. 19, 2007 (JP) .................. 2007-009805

(51) Int. Cl.
*G02F 1/1333* (2006.01)
*G02F 1/1335* (2006.01)

(52) U.S. Cl. ............ 349/58; 349/65; 349/64; 362/97.2; 362/633

(58) Field of Classification Search .............. 349/58, 349/64, 65, 57, 95; 362/632, 633, 634, 339, 362/97.1, 97.2
See application file for complete search history.

(56) References Cited

U.S. PATENT DOCUMENTS

| | | | |
|---|---|---|---|
| 7,338,184 B2 * | 3/2008 | Chen et al. | 362/246 |
| 7,453,192 B2 * | 11/2008 | Lee | 313/288 |
| 7,581,845 B2 * | 9/2009 | Lee | 362/97.2 |
| 2007/0285948 A1 | 12/2007 | Murakami et al. | |
| 2009/0059563 A1 | 3/2009 | Takata et al. | |

FOREIGN PATENT DOCUMENTS

| | | |
|---|---|---|
| CN | 1591126 A | 3/2005 |
| JP | 2000-10095 A | 1/2000 |
| JP | 2000-89222 A | 3/2000 |
| JP | 2003-215585 A | 7/2003 |
| JP | 2004-235103 A | 8/2004 |
| WO | WO-2006/070646 A1 | 7/2006 |
| WO | WO-2007/000851 A1 | 1/2007 |

* cited by examiner

*Primary Examiner* — Thoi Duong
(74) *Attorney, Agent, or Firm* — Birch, Stewart, Kolasch & Birch LLP

(57) ABSTRACT

A diffusion plate (DL) allowing the light from a fluorescent tube (71) to transmit therethrough is held on a support surface (1S, 1S) forming one surface of a side holder (SF). In particular, a support frame (FM) which also plays the role of the side holder (SF) supports the diffusion plate (DL) of a shape of which the long dimension and short dimension parts can be defined, for example, a rectangular shape at only two short dimension parts on its outer edges opposed to each other.

10 Claims, 29 Drawing Sheets

BACKLIGHT UNIT AND LIQUID CRYSTAL DISPLAY

BACKGROUND OF THE INVENTION

1. Field of the Invention

The present invention relates to a backlight unit that emits light and to a liquid crystal display that uses the light from the backlight unit.

2. Background Art

Conventionally, in a backlight unit of a liquid crystal display, a diffusion plate is incorporated, and a prism sheet (lens sheet) for improving light collection capability is disposed on the diffusion plate. In such a backlight unit, there has been a problem of deformation of resin members (a diffusion plate, a lens sheet and the like) which is caused by heat of a light source, especially, deformation of the resin members that is caused by heat conducted according to on/off of the light source or heat radiation. This is because a squeak sound is generated by contact between a bent diffusion plate and the like and other members if such deformation (bend) occurs.

As a backlight unit that solves such problem, there is a backlight unit 182 that is disclosed in a patent document 1 and shown in FIG. 26. The backlight unit 182 sandwiches a relatively thin diffusion sheet 192 and a lens sheet SS' located to cover the diffusion sheet 192 between a light guide plate 191 and a relatively thick diffusion plate DL', so that both sheets 192 and SS' are prevented from being bent. Besides, because the diffusion plate DL' is supported by a surface of the light guide plate 191 via both sheets 192 and SS', the diffusion plate DL' is not easily bent. Accordingly, in such backlight unit 182, a squeak sound caused by bend of both sheets 192, SS', and the diffusion plate DL' is not generated.

[Patent document 1]: JP-A-2000-10095

SUMMARY OF THE INVENTION

Problems to be Solved by the Invention

However, in a case of the backlight unit 182 which is shown in FIG. 27 and three surface views (a plan view, a sectional view taken along the a-a' line and seen in the a-a' arrow direction of the plan view, and a sectional view taken along the b-b' line and seen in the b-b' arrow direction of the plan view) illustrated in FIG. 28 and does not incorporate a light guide plate, the diffusion plate DL' is supported by a frame FM' that supports the outer edge of the DL'; and the lens sheet SS' is so located as to cover the diffusion plate DL'.

In this case, as shown in FIG. 29, the longer sides of the diffusion plate DL' that are not supported by a surface are easily bent; and further, the lens sheet SS'also is bent together with the bend of the diffusion plate DL' (the bend tends to occur irregularly and causes deterioration of the quality of backlight). Consequently, contact occurs between the bent diffusion plate DL' and the like and the frame FM', so that a squeak sound is generated.

The present invention has been made to deal with the conventional situation, and it is an object of the present invention to provide a backlight unit that prevents a squeak sound caused by contact between members from occurring and a liquid crystal display that incorporates the backlight unit.

Means for Solving the Problem

The present invention is a backlight unit that holds a diffusion member transmitting light from a light source therethrough by supporting the diffusion member with a support frame. In this backlight unit, the diffusion member has a shape the longer and shorter sides of which are able to be defined; and the support frame supports only the shorter sides located at two opposite places of an outer edge of the diffusion member.

In such backlight unit, the contact (especially, the contact area) between members that causes a squeak sound has a relatively small area between the shorter sides of the diffusion member and the support frame. Accordingly, it is possible to prevent generation of a squeak sound.

As an example of the support frame, there is a support frame that includes: a first block for supporting only two opposite shorter sides of the outer edge of the diffusion member; and a second block facing two opposite longer sides of the outer edge of the diffusion member. It is desirable that the support frame meets the following conditional formula (1) when the thickness of the first block along the thickness direction of the diffusion member is $T_1$, and the thickness of the second block along the thickness direction of the diffusion member is $T_2$:

$$T_1 > T_2 \qquad \text{conditional formula (1)}$$

If the conditional formula (1) is met, the diffusion plate invariably comes into contact with the first block but does not easily come into contact with the second block. Accordingly, the contact between members that causes a squeak sound has a relatively small area.

It is desirable that at least one of a support surface, that is, a surface of the first block that supports the diffusion member and an elevation surface, that is, a surface of the second block that faces the diffusion member is concaved.

In another backlight unit, the support frame includes: at least three main columns arranged circularly for supporting the diffusion member; and a sub-column that is disposed between the main columns circularly arranged next to each other and shorter than the main columns.

Even in such backlight unit, the contact between members that causes a squeak sound has a relatively small area between the diffusion member and the main columns. Accordingly, it is possible to prevent generation of a squeak sound.

In a case where a plurality of sub-columns are arranged between the main columns, it is desirable that the lengths of the sub-columns gradually decrease from the main column to the center point between the main columns. According to this arrangement, the bend shape of part of the diffusion plate that corresponds to a region between the main columns can match the shape that virtually connects the tip ends of the sub-columns to each other. Accordingly, the sub-columns have a so suitable shape as to avoid contact with a bent diffusion plate.

In a case where the diffusion member has a shape the longer and shorter sides of which are able to be defined, it is desirable that the main column is located to face two opposite shorter sides of the outer edge of the diffusion member; and the sub-column is located to face two opposite longer sides of the outer edge of the diffusion member. A reason for this is that because the longer side of the diffusion plate is prone to be bent compared with the shorter side, it is easy to avoid contact between members if the sub-column is so located as to correspond to the longer side.

It is desirable that the support frame includes a third block that faces the two opposite shorter sides of the outer edge of the diffusion member; and the main column is disposed on one surface of the third block that faces the diffusion member. Further, it is desirable that besides the third block, the support frame includes a fourth block that faces the two longer sides of the outer edge of the diffusion member; and the sub-column is disposed on one surface of the fourth block that faces the diffusion member.

An end surface of the sub-column that faces the diffusion member may be concaved. Besides, in the backlight unit that includes the third and fourth blocks as the support frame, it is desirable that the following conditional formula (2) is met when the thickness of the third block along the thickness direction of the diffusion member is $T_3$, and the thickness of the fourth block along the thickness direction of the diffusion member is $T_4$:

$$T_3 > T_4 \quad \text{conditional formula (2)}$$

It is desirable that at least one of the one surface of the third block on which the main column is disposed and the one surface of the fourth block on which the sub-column is disposed is concaved.

In the backlight unit described above, the support frame that supports only the shorter sides located at two opposite places of the outer edge of the diffusion member is used as an example. However, the support frame is not limited to this example. For example, the support frame may support only the longer sides located at two opposite places of the outer edge of the diffusion member.

A reason for this is that the total contact area between the longer sides located at two opposite places of the outer edge of the diffusion member and the support frame is smaller than the total contact area between both longer and shorter sides of the outer edge of the diffusion member and the support frame; so that it is possible to prevent generation of a squeak sound.

There are various kinds of diffusion members. For example, as the diffusion member, there is a diffusion plate for diffusing light from the light source or a diffusion unit that includes a lenticular lens layer disposed on the diffusion plate via an optical member containing dispersed particles.

It is desirable that the diffusion member contains methyl methacrylate-styrene or polycarbonate.

A liquid crystal display that includes the above backlight unit and a liquid crystal display panel that receives light from the backlight unit is also the present invention.

Advantages of the Invention

In the backlight unit according to the present invention, the contact area between the inside members becomes extremely small. Accordingly, a squeak sound depending on the contact area is not easily generated.

LIST OF REFERENCE SYMBOLS

FM support frame
SF side holder (support frame)
BK block (support frame)
BK1 first block (support frame)
1S one surface of the first block (support surface)
BK2 second block (support frame)
2S one surface of the second block (elevation surface)
BK3 third block (support frame)
3S one surface of the third block
BK4 fourth block (support frame)
4S one surface of the fourth block
PE column (support frame)
MPE main column (support frame)
SPE sub-column (support frame)
1P end surface of main column
2P end surface (opposite end surface) of sub-column
DL diffusion plate (diffusion member)
Ss lens sheet
OD optical member
LL lenticular lens layer
DLU diffusion unit (diffusion member)
21 rib
81 liquid crystal display panel unit
82 backlight unit
83 bezel
89 liquid crystal display

DETAILED DESCRIPTION OF THE INVENTION

Embodiment 1

An embodiment is explained based on drawings as follows. Member numbers are omitted in some drawings for convenience. In such case, other drawings are referred to. Besides, a black dot in a drawing means a direction perpendicular to the paper surface.

Figure 25:
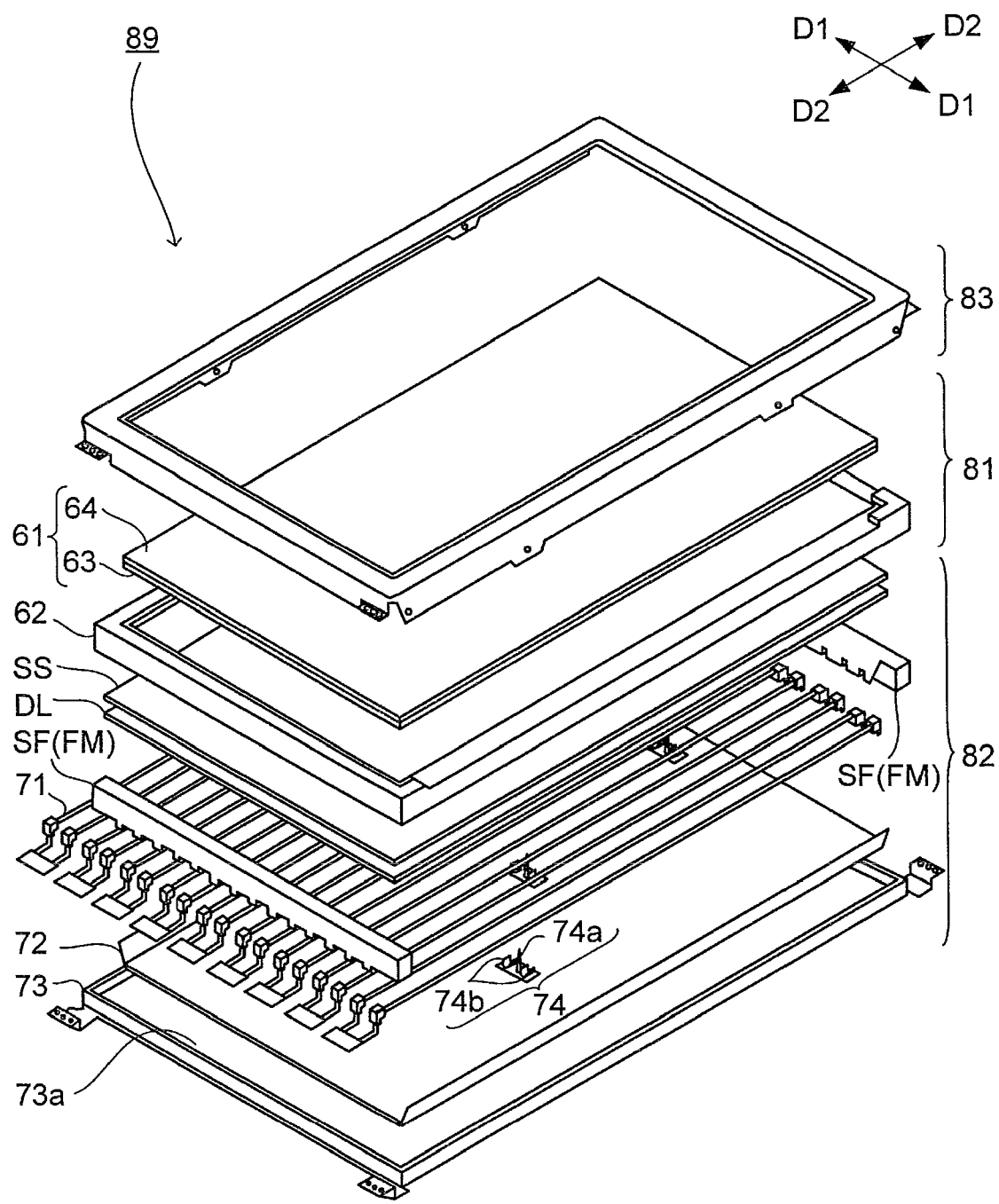
FIG. 25 is an exploded perspective view of a liquid crystal display.
Figure 26:
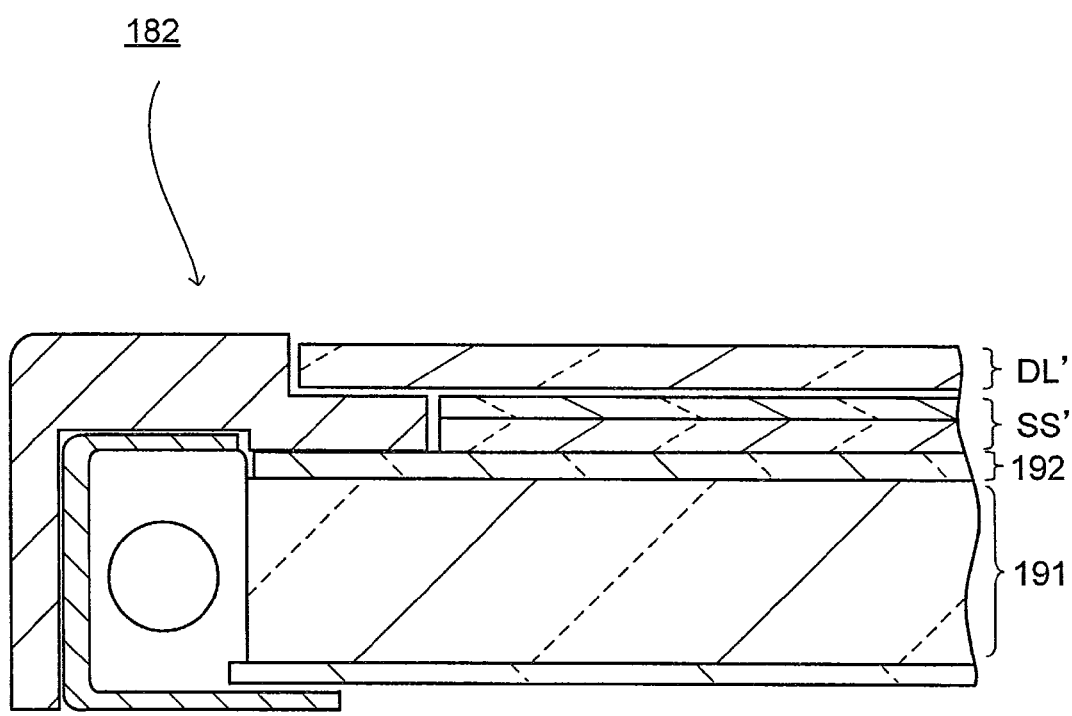
FIG. 26 is a sectional view showing a conventional backlight unit.
Figure 27:
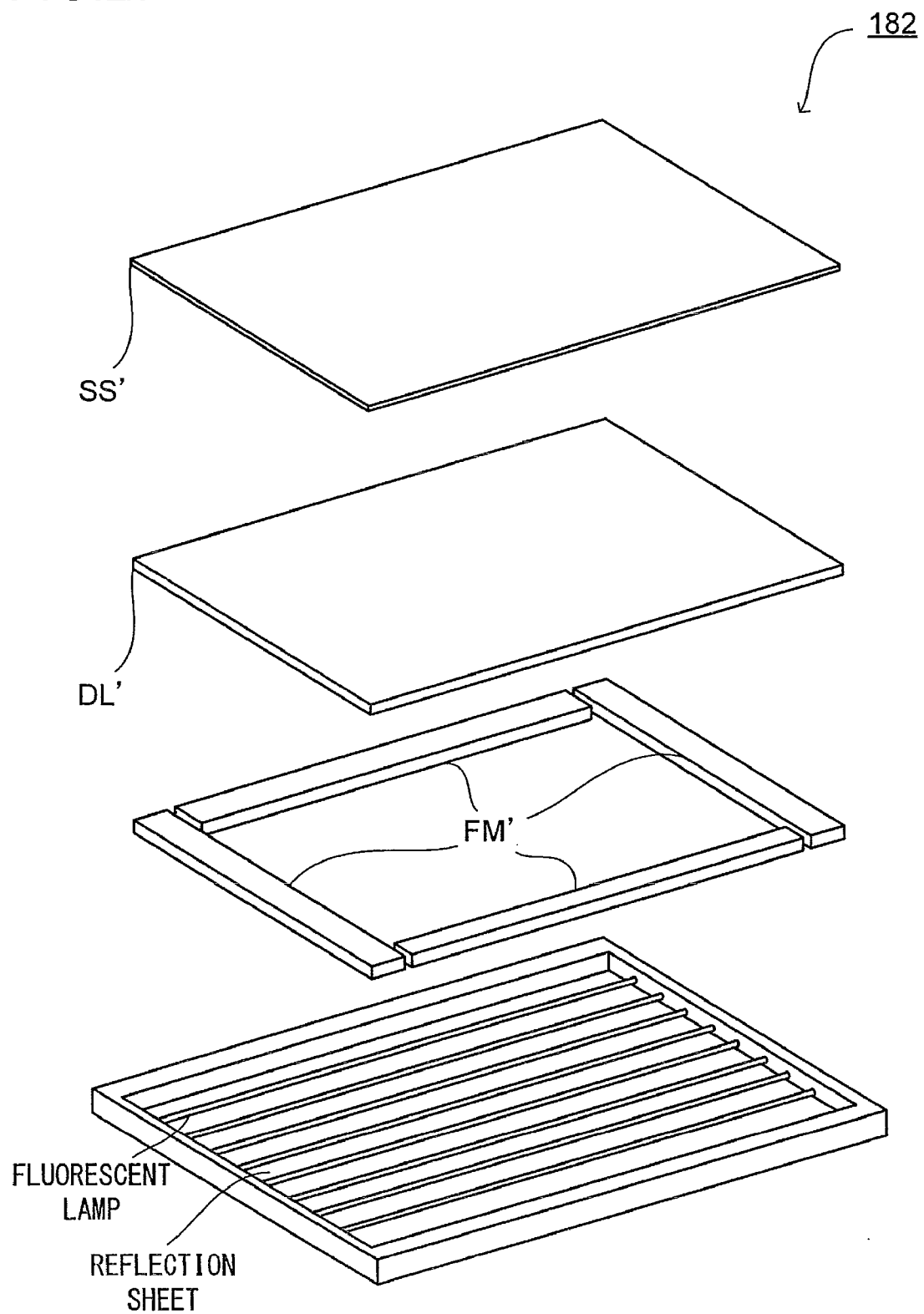
FIG. 27 is an exploded perspective view showing a conventional backlight unit.
Figure 28:
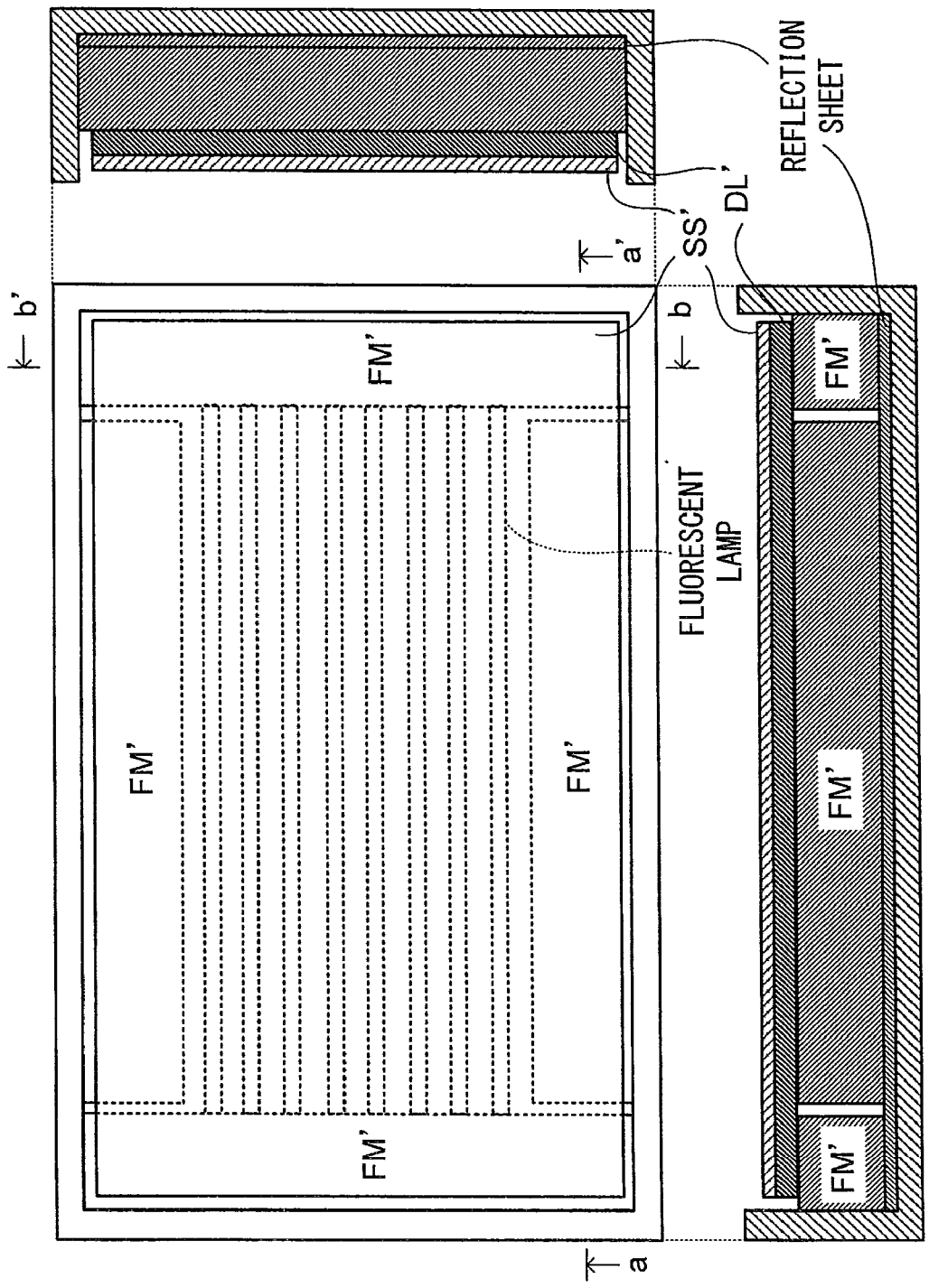
FIG. 28 is a three-surface view of FIG. 27 and shows a plan view, a sectional view taken along the a-a' line and seen in the a-a' arrow direction, and a sectional view taken along the b-b' line and seen in the b-b' arrow direction.
Figure 29:
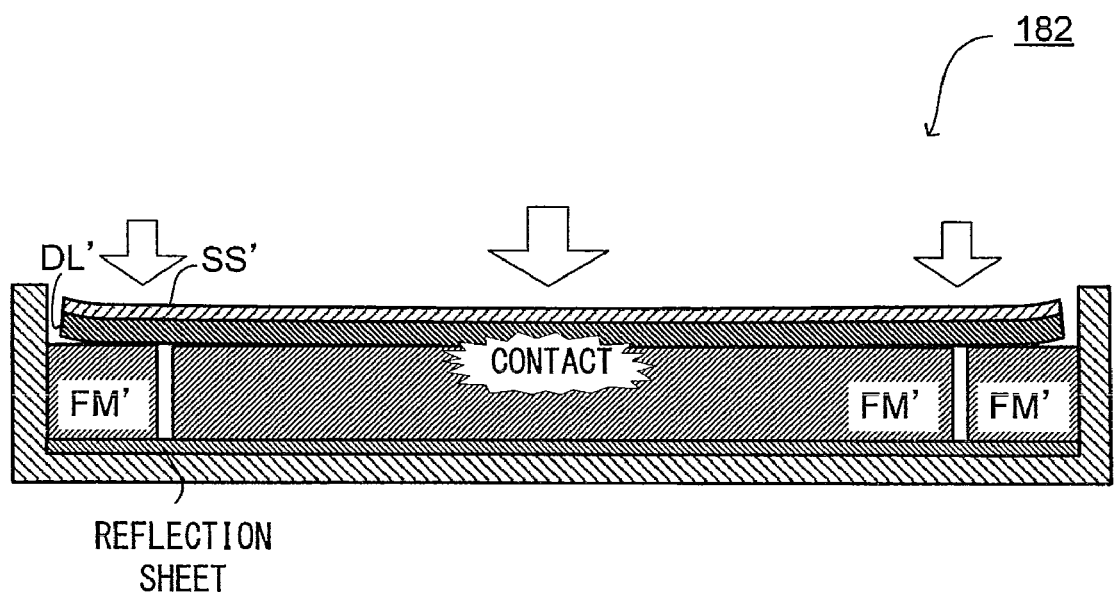
FIG. 29 is a sectional view taken along the a-a' line and seen in the a-a' arrow direction in a case where a diffusion plate of the backlight unit is bent.

FIG. 25 shows an exploded perspective view of a liquid crystal display 89. As shown in FIG. 25, the liquid crystal display 89 includes a liquid crystal display panel unit 81, a backlight unit 82, and a bezel 83 that covers the outer edges of both units 81 and 82.

The liquid crystal display panel unit 81 includes a liquid crystal display panel 61 and a frame-shaped chassis (panel chassis) 62 that supports the outer edge of the liquid crystal display panel 61.

The liquid crystal display panel 61 includes a active matrix board (AM board) 63, an opposite board 64 that is opposite and bonded to the AM board 63 with a sealant (not shown), and liquid crystal (not shown) injected into the gap between the two boards 63 and 64. The liquid crystal display panel 61 includes an optical member (e.g., a polarization sheet, a phase retardation sheet: not shown) that sandwiches the AM board 63 and the opposite board 64.

The liquid crystal display panel 61 is supported by the panel chassis 62 and is located so as to overlay the backlight unit 82, and functions as a display panel that receives light (backlight) from the backlight unit 82.

The backlight unit 82 includes a fluorescent lamp (light source) 71, a side holder SF (support frame FM), a reflection sheet 72, a diffusion plate (diffusion member) DL, a lens sheet SS, a backlight chassis 73, and a support pin base 74.

The fluorescent lamp (linear light) 71 emits light and a plurality of the fluorescent lamps 71 are arranged in the backlight unit 82 (only a few of them are shown in the figure for convenience). Here, the length in the direction (arrangement direction) in which the fluorescent lamps 71 are arranged is shorter than the length in the longitudinal direction of the fluorescent lamp 71. Accordingly, if a surface is defined by the plurality of fluorescent lamps 71 arranged, the surface becomes rectangular. From this reason, hereinafter, the arrangement of the fluorescent lamps 71 is called a rectangular arrangement. Besides, hereinafter, the arrangement direction of the fluorescent lamps 71 is called a first direction D1 and the linear direction (longitudinal direction) of the fluorescent lamp 71 is called a second direction D2.

The side holder SF includes: a block BK (a first block BK1; see FIG. 1) that supports one end of the plurality of fluorescent lamps 71; and a block BK (the first block BK1) that supports the other end of the plurality of fluorescent lamps 71. In other words, the side holder SF holds the fluorescent lamps 71 by supporting both ends of the plurality of fluorescent lamps 71.

The first block BK servings as the side holder SF has a plate shape, and one surface (support surface 1S) of the first block BK in the same direction as that in the surface of a bottom portion 73a of the backlight chassis 73 (in detail, the reflection sheet 72 located on the bottom portion 73a of the backlight chassis 73) faces the diffusion plate DL.

The reflection sheet 72 is so located as to be covered by the rectangularly arranged fluorescent lamps 71, so that the reflection sheet 72 reflects part of the radial light (the radial light with respect to the fluorescent lamps 71) emitted from the fluorescent lamps 71.

The diffusion plate DL is formed of a resin such as methyl methacylate-styrene or polycarbonate that have a function to disperse light and a function to diffuse light, and is so located as to cover the rectangularly arranged fluorescent lamps 71. Accordingly, the diffusion plate DL receives the light (emitted light) from the fluorescent lamps 71 and the light (reflected light) from the reflection sheet 72, disperses and diffuses them so as to spread the light in the surface direction.

The diffusion plate DL is easily deformed (easily bent) by heat. However, in the production process, it is possible to predict a bend direction of the diffusion plate DL according to a difference between machining temperatures respectively applied to the front surface and the back surface of the diffusion plate DL. Especially, in a case where the diffusion plate DL has a rectangular shape so as to cover the rectangularly arranged fluorescent lamps 71, because the diffusion plate DL is easily bent in the longitudinal direction, it is easy to predict the bend direction.

For example, the lens sheet SS has a lens shape in the sheet surface, deflects (collects light) the radiation characteristic of light and is so located as to cover the diffusion plate DL. Accordingly, the lens sheet SS receives light going through the diffusion plate DL and collects the light so as to improve the light brightness per area.

The backlight chassis 73 is a chassis that is able to house the fluorescent lamps 71, the reflection sheet 72, the diffusion plate DL, the lens sheet SS and the like. However, the shape is not limited. For example, as shown in FIG. 25, a box-shaped backlight chassis 73 may be employed.

The support pin base 74 is so formed as to be upright from the bottom portion 73a of the backlight chassis 73. The support pin base 74 protrudes a support pin 74a through an opening formed through a portion of the reflection sheet 72 and further through between the fluorescent lamps 71, 71. Accordingly, the support pin base 74 supports the diffusion plate DL by making the support pin 74a come into contact with the diffusion plate DL that is so located as to cover the fluorescent lamps 71. The length of the support pin 74a is not limited.

Besides, the support pin base 74 includes fluorescent lamp hooks 74b, 74b for grasping the fluorescent lamp 71 on both sides of the bottom end of the support pin 74a. Accordingly, the support pin 74 supports the diffusion plate DL with the support pin 74a and surely fixes the fluorescent lamp 71 with the fluorescent lamp hooks 74b.

Figure 1:
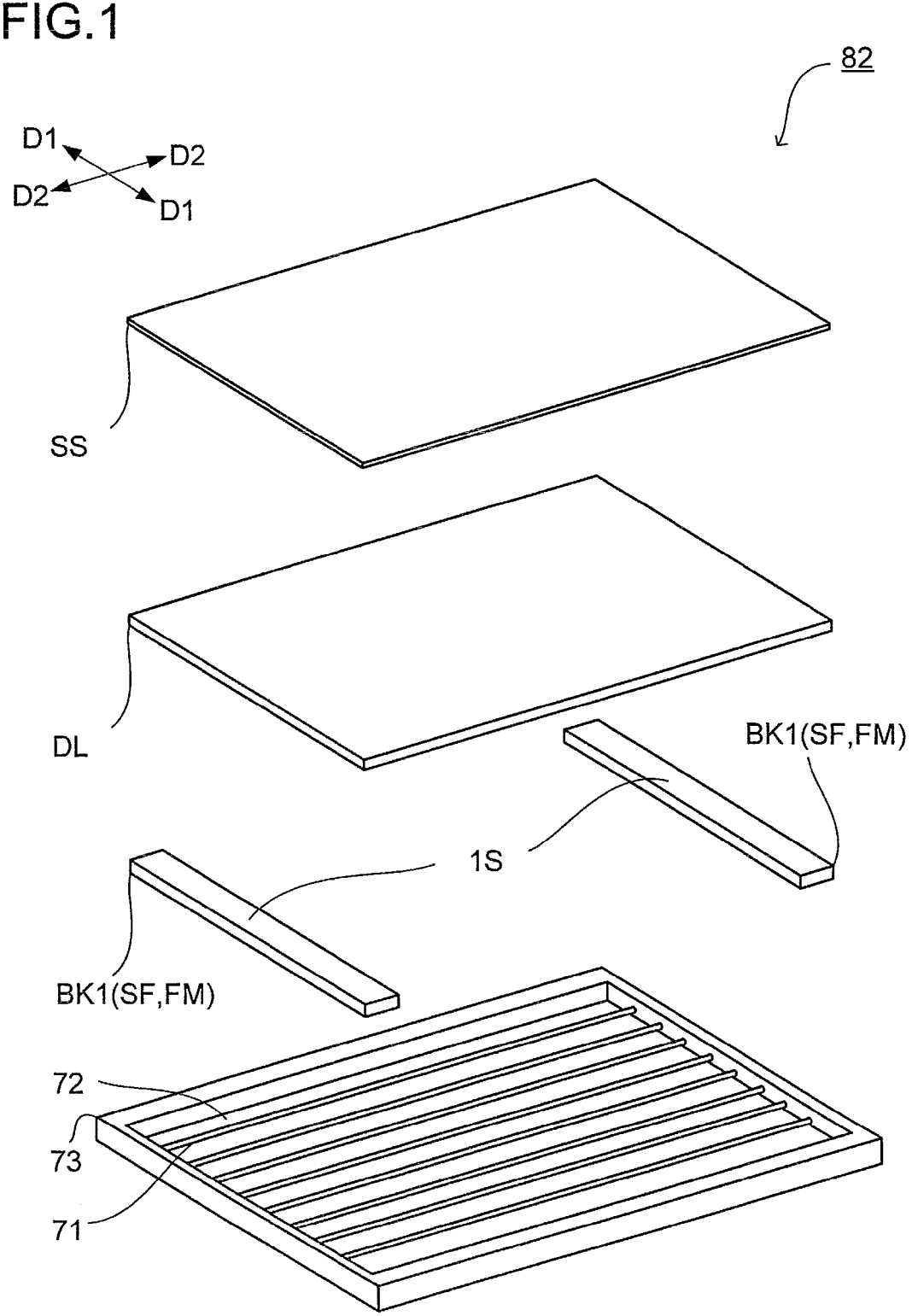
FIG. 1 is an exploded perspective view of a backlight unit (an example 1) shown in FIG. 25.
Figure 2:
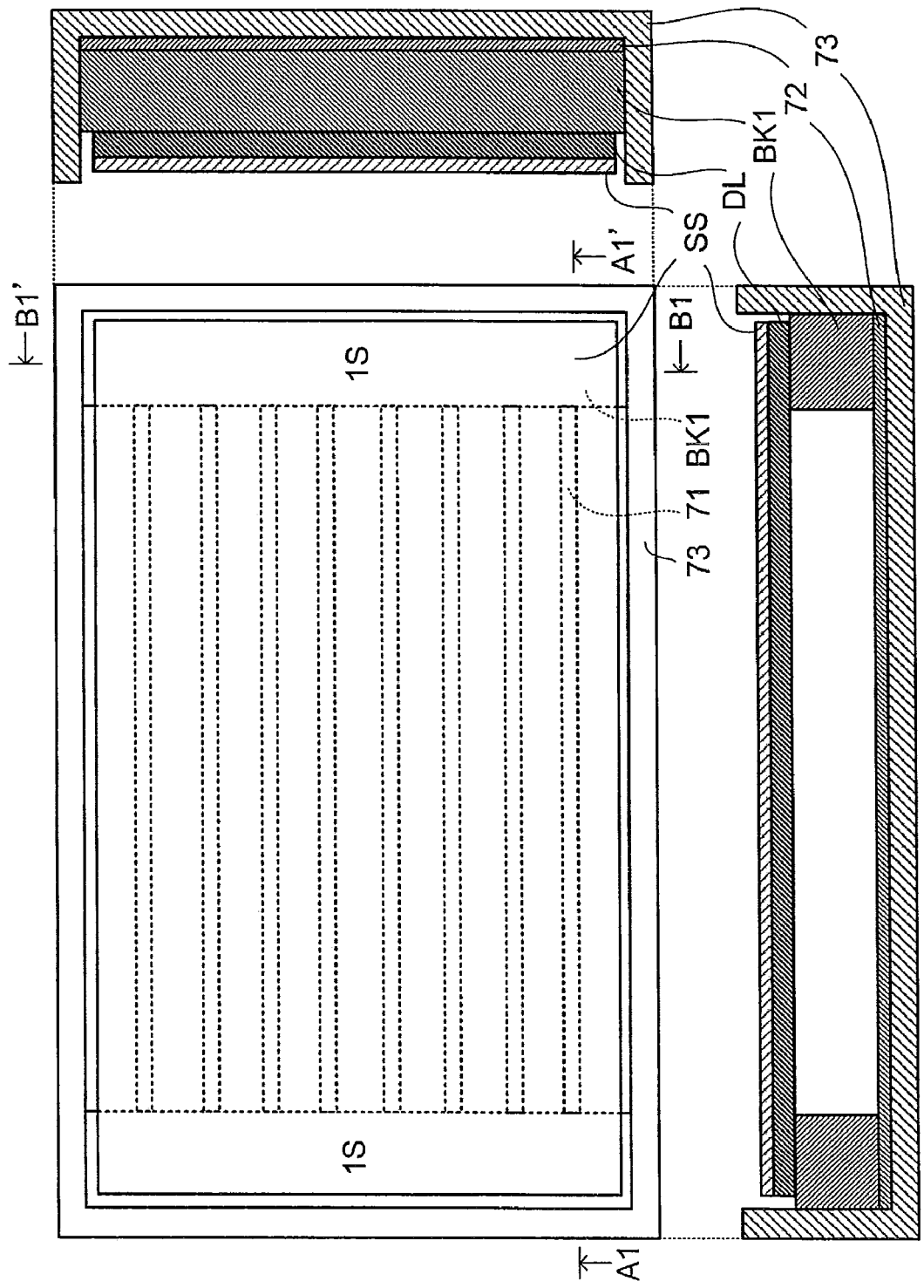
FIG. 2 is a three-surface view of FIG. 1 and shows a plan view, a sectional view taken along the A1-A1' line and seen in the A1-A1' arrow direction, and a sectional view taken along the B1-B1' line and seen in the B1-B1' arrow direction.
Figure 3:
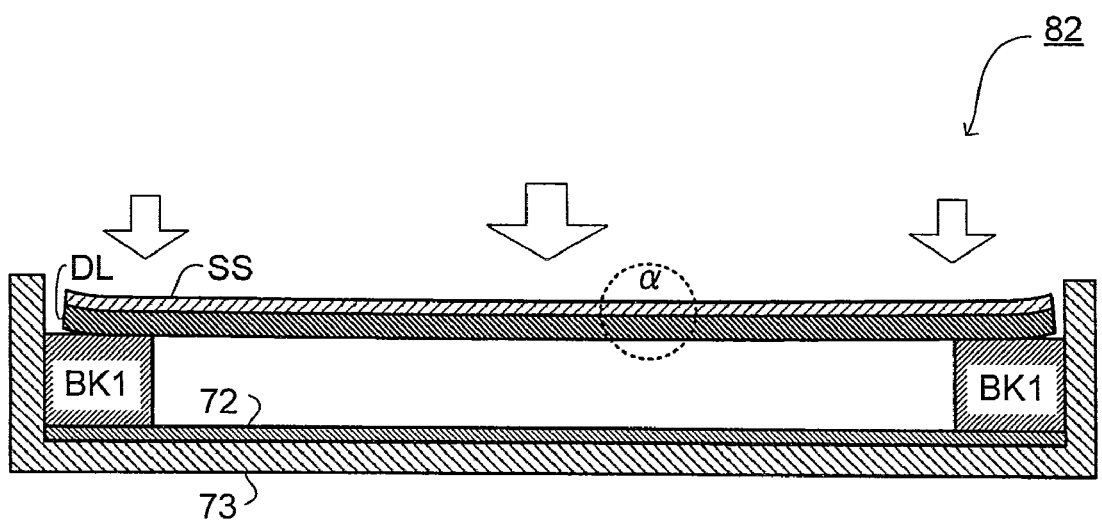
FIG. 3 is a sectional view taken along the A1-A1' line and seen in the A1-A1' arrow direction in a case where a diffusion plate of the backlight unit is bent.

Here, the backlight unit 82 is described in detail using the simplified FIGS. 1 to 3 (the example 1) of the backlight unit 82 shown in FIG. 25. FIG. 1 is an exploded perspective view of the backlight unit 82; FIG. 2 is a three-surface view (a plan view of the backlight unit 82, a sectional view taken along the A1-A1' line and seen in the A1-A1' arrow direction in the plan view, and a sectional view taken along the B1-B1' line and seen in the B1-B1' arrow direction in the plan view); and FIG. 3 is a sectional view taken along the A1-A1' line and seen in the A1-A1' arrow direction in a case where the diffusion plate DL of the backlight unit 82 is bent. In these figures, the support pin base 74 is omitted for convenience.

As shown in FIGS. 1 to 3, the backlight unit 82 supports the diffusion plate DL for transmitting the light from the fluorescent lamps 71 with the support surfaces 1S, 1S that are each one surface of the side holder SF (in detail, the first blocks BK1, BK1) and thus holds the diffusion plate DL. Accordingly, the side holder SF is also called a support frame FM. Especially, the support frame FM that plays a role of the side holder SF as well supports only shorter sides located at two opposite places (two opposite shorter sides) of the outer edge of the diffusion plate DL that has a shape, for example, a rectangular shape which is able to be defined by longer and shorter sides.

Besides, the backlight unit 82 matches a predictable bend direction of the diffusion plate DL (in detail, a bend direction of the longer sides of the diffusion plate DL) with a direction that goes away from the liquid crystal display panel 61. Accordingly, if light heat from the fluorescent lamps 71 acts on the diffusion plate DL, the diffusion plate DL is bent (curved) toward the reflection sheet 72 as shown by the white arrows in FIG. 3.

Here, in this backlight unit 82, only the shorter sides of the outer edge of the diffusion plate DL come in contact with the support frame FM. Accordingly, even if the longer sides of the outer edge of the diffusion plate DL are bent, the longer sides do not come into contact with any members, so that an unusual sound (a squeak sound) caused by contact is not generated. Besides, even if the diffusion plate DL returns to the original state when the heat acting on the diffusion plate DL is radiated after the fluorescent lamps 71 are turned off, the longer sides of the diffusion plate DL do not come into contact with any members, so that a squeak sound caused by contact is not generated.

In other words, the backlight unit 82 makes the contact area as small as possible between the diffusion plate DL and the support frame FM (in other words, only the shorter sides of the diffusion plate DL come into contact with the support frame FM), thereby lowering a squeak sound caused by the contact between both diffusion plate DL and support frame FM.

From the viewpoint for the smallest possible contact area between the diffusion plate DL and the support frame FM, the support frame FM may support longer sides located at two opposite places (two opposite longer sides) of the outer edge of the diffusion plate DL. A reason for this is that the contact area between only the two opposite longer sides of the outer edge of the diffusion plate DL and the support frame FM is smaller than the contact area between both longer and shorter sides of the outer edge of the diffusion plate DL and the support frame FM; accordingly, it is possible to prevent a squeak sound from being generated.

Figure 4:
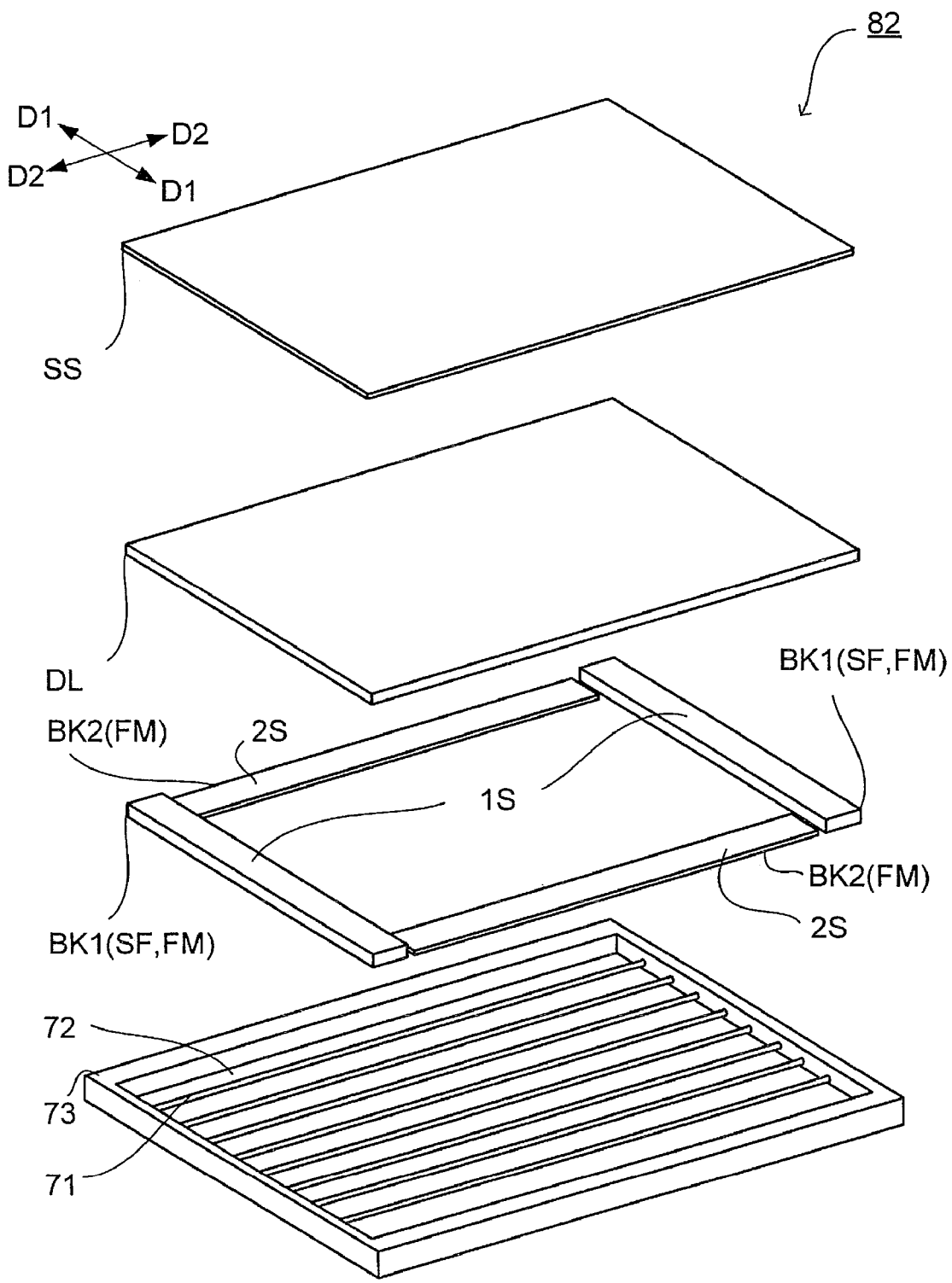
FIG. 4 is an exploded perspective view of another example (an example 2) of the backlight unit shown in FIG. 1.
Figure 5:
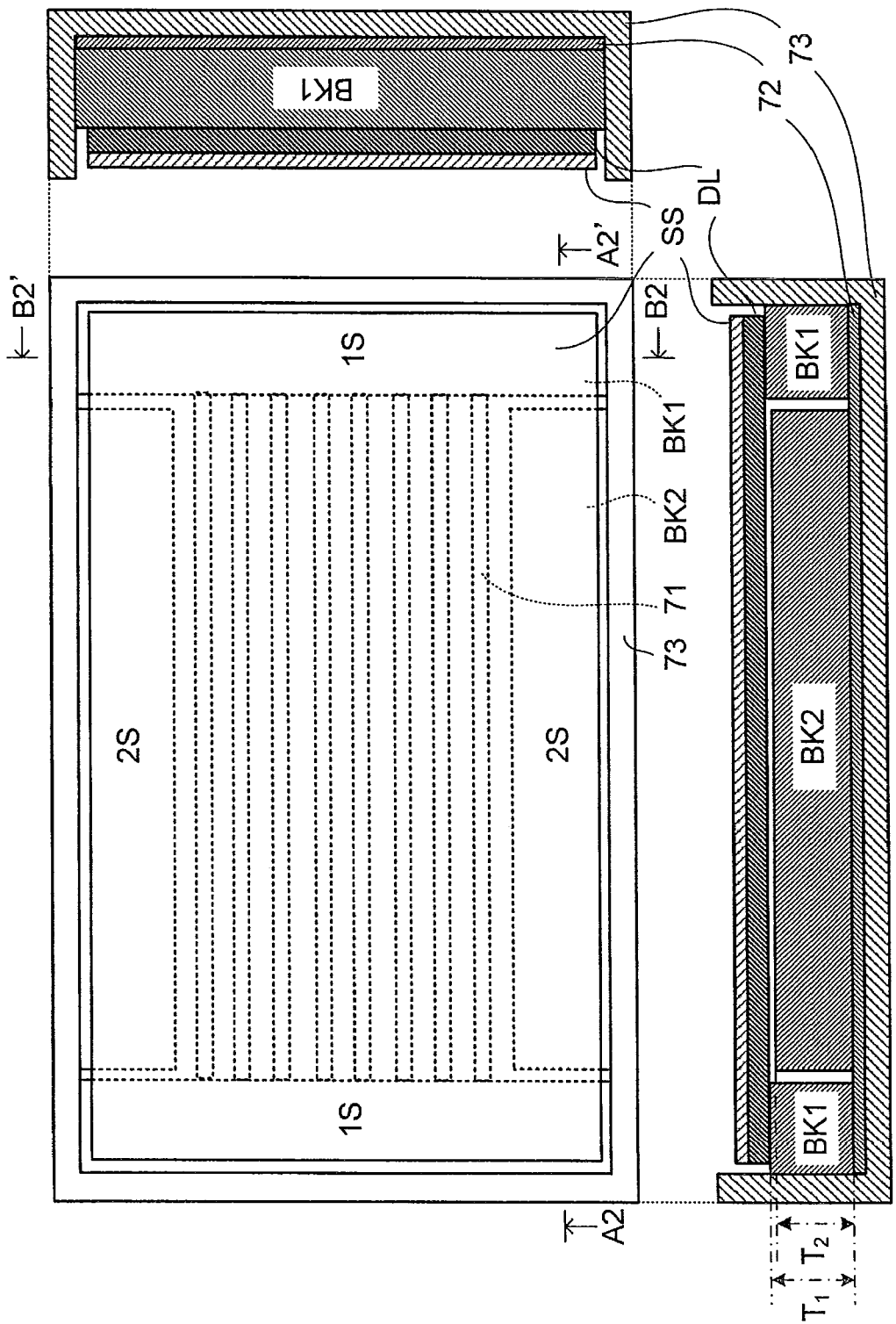
FIG. 5 is a three-surface view of FIG. 4 and shows a plan view, a sectional view taken along the A2-A2' line and seen in the A2-A2' arrow direction, and a sectional view taken along the B2-B2' line and seen in the B2-B2' arrow direction.
Figure 6:
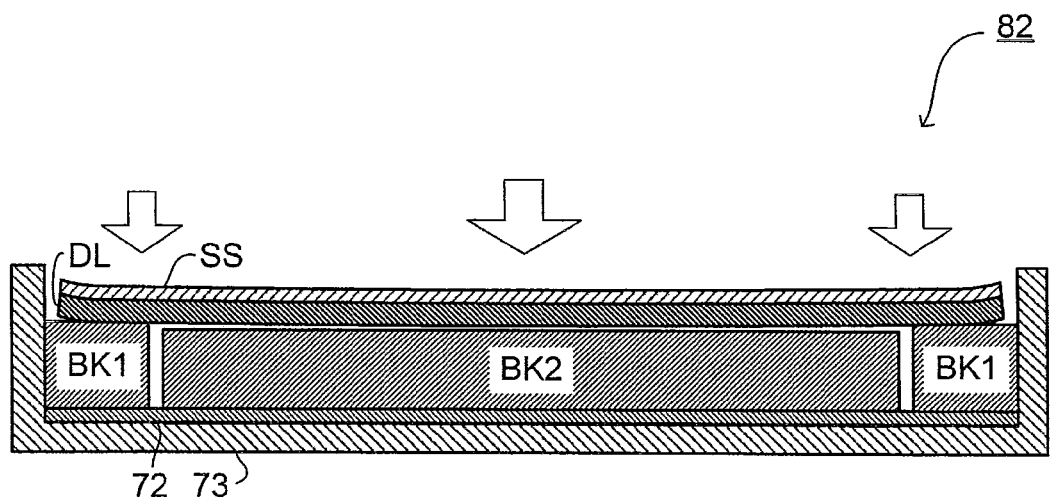
FIG. 6 is a sectional view taken along the A2-A2' line and seen in the A2-A2' arrow direction in a case where a diffusion plate of the backlight unit is bent.
Figure 7:
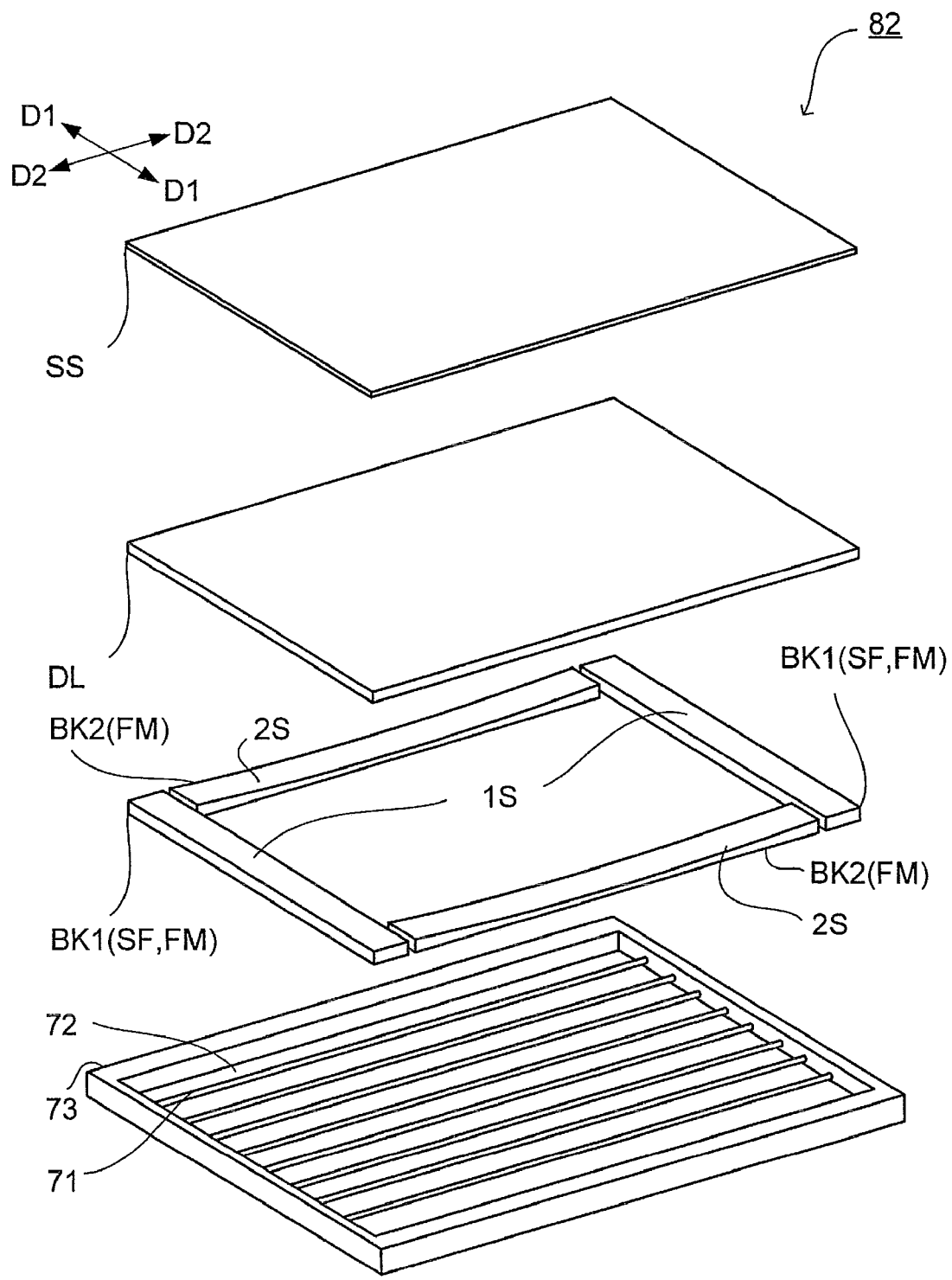
FIG. 7 is an exploded perspective view of another example (an example 3) of the backlight units shown in FIGS. 1 and 4.
Figure 8:
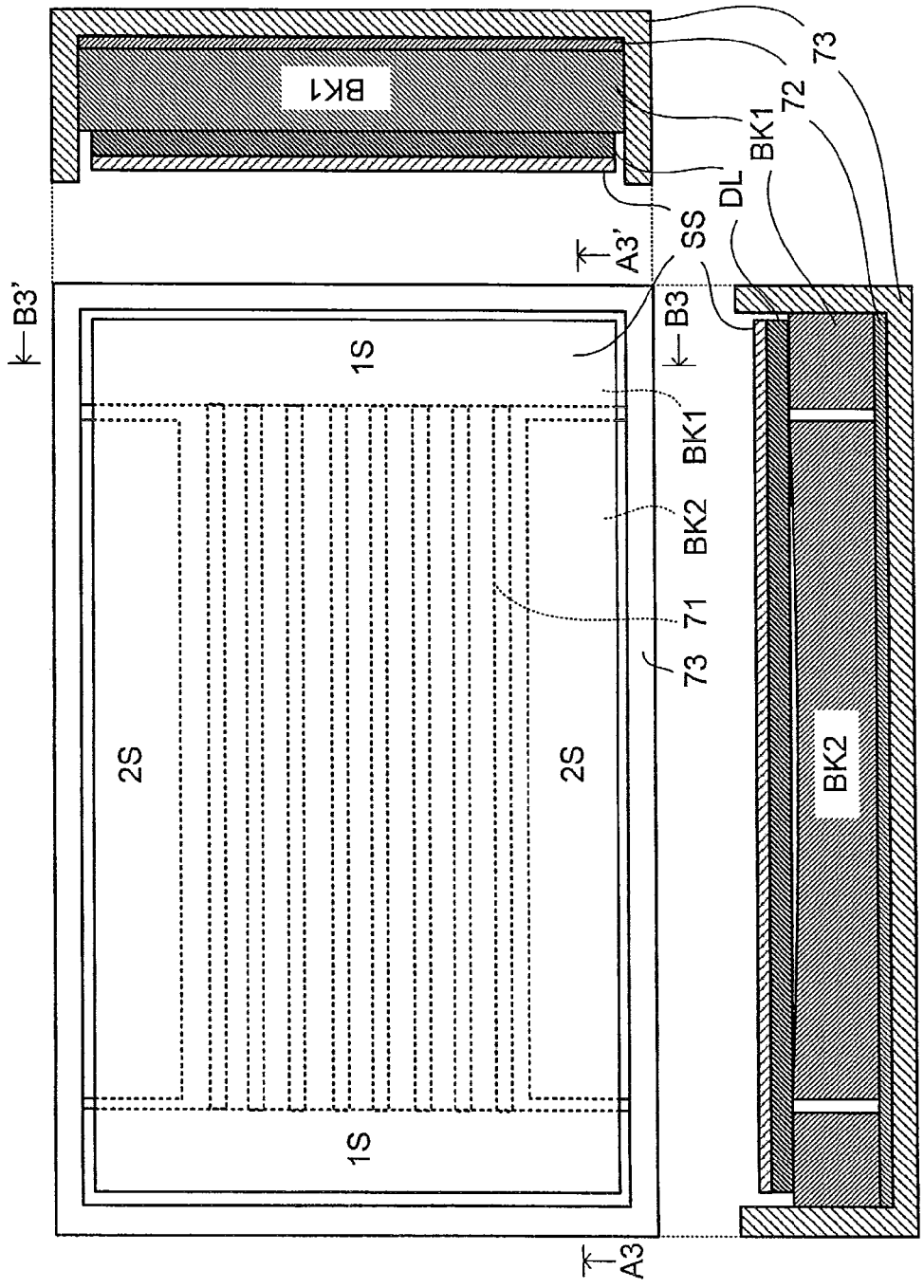
FIG. 8 is a three-surface view of FIG. 7 and shows a plan view, a sectional view taken along the A3-A3' line and seen in the A3-A3' arrow direction, and a sectional view taken along the B3-B3' line and seen in the B3-B3' arrow direction.
Figure 9:
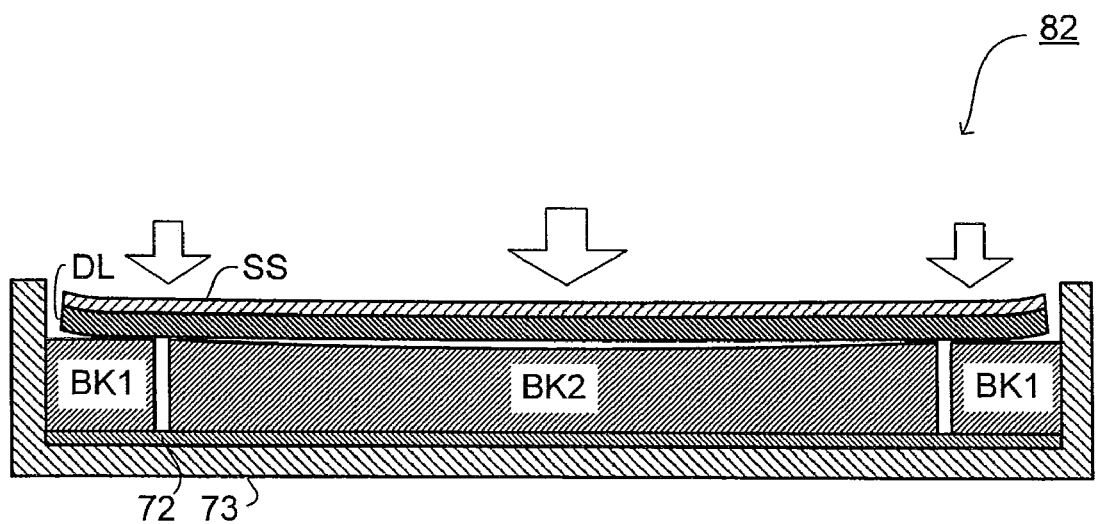
FIG. 9 is a sectional view taken along the A3-A3' line and seen in the A3-A3' arrow direction in a case where a diffusion plate of the backlight unit is bent.

There are some other examples of the above backlight unit 82 that relatively reduces the contact area between the diffusion plate DL and the support frame FM. For example, there are a backlight unit 82 according to an example 2 shown in FIGS. 4 to 6, and a backlight unit 82 according to an example 3 shown in FIGS. 7 to 9. FIGS. 4 and 7 are illustrated in the same way as FIG. 1, FIGS. 5 and 8 are illustrated in the same way as FIG. 2, and FIGS. 6 and 9 are illustrated in the same way as FIG. 3.

In the backlight unit 82 according to the example 2, two blocks BK (second blocks BK2, BK2) each having one surface (elevation surface 2S) in the same direction as that of the support surface 1S of the block BK1, that is, the support frame FM, are included. Hereinafter, an explanation is performed describing that these second blocks BK2 are part of the support frame FM.

The backlight unit 82 in the example 2 includes, as the support frame FM, the first blocks BK1, BK1 that support only the two opposite shorter sides of the outer edge of the diffusion plate DL and the second blocks BK2, BK2 that face the two opposite longer sides of the outer edge of the diffusion plate DL.

The thickness of the first block BK1 along the plate-thickness direction (thickness direction) of the diffusion plate DL is different from the thickness of the second block BK2 along the plate-thickness direction (thickness direction) of the diffusion plate DL. Specifically, when the thickness of the first block BK1 is $T_1$ and the thickness of the second block BK2 is $T_2$, the following conditional formula A is met (see FIG. 5):

$$T_1 > T_2 \qquad \text{conditional formula A}$$

According to this, as shown in FIG. 6, even if the longer sides of the diffusion plate DL are bent, the longer sides and the second block BK2 do not come into contact with each other, so that a squeak sound caused by contact is not generated. Specifically, the backlight unit 82 provides a space for accepting a bend (warp) of the diffusion plate DL between the diffusion plate DL and the second block BK2 by meeting the conditional formula A [conditional formula (1)].

In the backlight unit 82 according to the example 3 shown in FIGS. 7 to 9, the elevation surface 2S, that is, one surface of the second block BK2 that faces the diffusion plate DL is concaved. In detail, the second block BK2 is concaved deepest at the center of the longer side thereof and the concave amount decreases from the center to the end of the longer side so that the elevation surface 2S is concaved into a curved surface.

Because of this concaved surface, as shown in FIG. 9, even if the longer sides of the diffusion plate DL are bent, the longer sides and the elevation surface 2S of the second block BK2 do not come into contact with each other, so that a squeak sound caused by contact is not generated. Specifically, in the backlight unit 82, a space for accepting a bend of the diffusion plate DL is provided between the diffusion plate DL and the elevation surface 2S of the second block BK2 by concaving the elevation surface 2S.

The concave is not limited only to the elevation surface 2S of the second block BK2, and may be formed on the support surface 1S, that is, one surface of the first block BK1 that supports the diffusion plate DL (The support surface 1S may be concaved into a curved surface with the first block BK1 concaved deepest at the center of the longer side thereof and the concave amount decreases from the center to the end of the longer side).

This is because a bend is formed on the shorter side of the diffusion plate DL as well. Specifically, according to this, the contact area between the shorter side of the diffusion plate DL and the support surface 1S of the first block BK1 becomes relatively small, so that a squeak sound depending on the contact area becomes low.

Accordingly, if both of the elevation surface 2S of the second block BK2 and the support surface 1S of the first block BK1 are concaved, it is possible to prevent a squeak sound from being generated most effectively. However, even if at least one of the support surface 1S of the first block BK1 and the elevation surface 2S of the second block BK2 is concaved, the effect of reducing a squeak sound is obtained.

Besides, the second blocks BK2, BK2 are located between the first blocks BK1, BK1 of the support frame FM (between one end of one of the first opposite blocks BK1 and one end of the other of the first opposite blocks BK1), thereby preventing foreign matter from invading the backlight unit 82. Accordingly, it is desirable that the adjacent first blocks Bk1, BK1 and the second blocks BK2, BK2 are in tight contact with each other (they may be connected to each other).

In addition, the second block BK2 prevents the diffusion plate DL from being excessively bent toward the reflection sheet 72 (the bottom portion of the backlight chassis 73). Specifically, only if the diffusion plate DL is excessively bent, the second blocks BK2 play a role in supporting the diffusion plate DL.

Embodiment 2

An embodiment 2 is explained. Here, members that have the same functions as those used in the embodiment 1 are indicated by the same reference numbers and the explanation of them is skipped.

As one of the causes of a squeak sound in the backlight unit 82, there is contact between the diffusion plate DL and other members (the side holder SF and the like). Accordingly, the backlight unit 82 that does not easily generate such contact is desirable for reduction in a squeak sound. From this reason, hereinafter, an example (examples 4 to 6) of such backlight unit 82 is explained.

Figure 10:
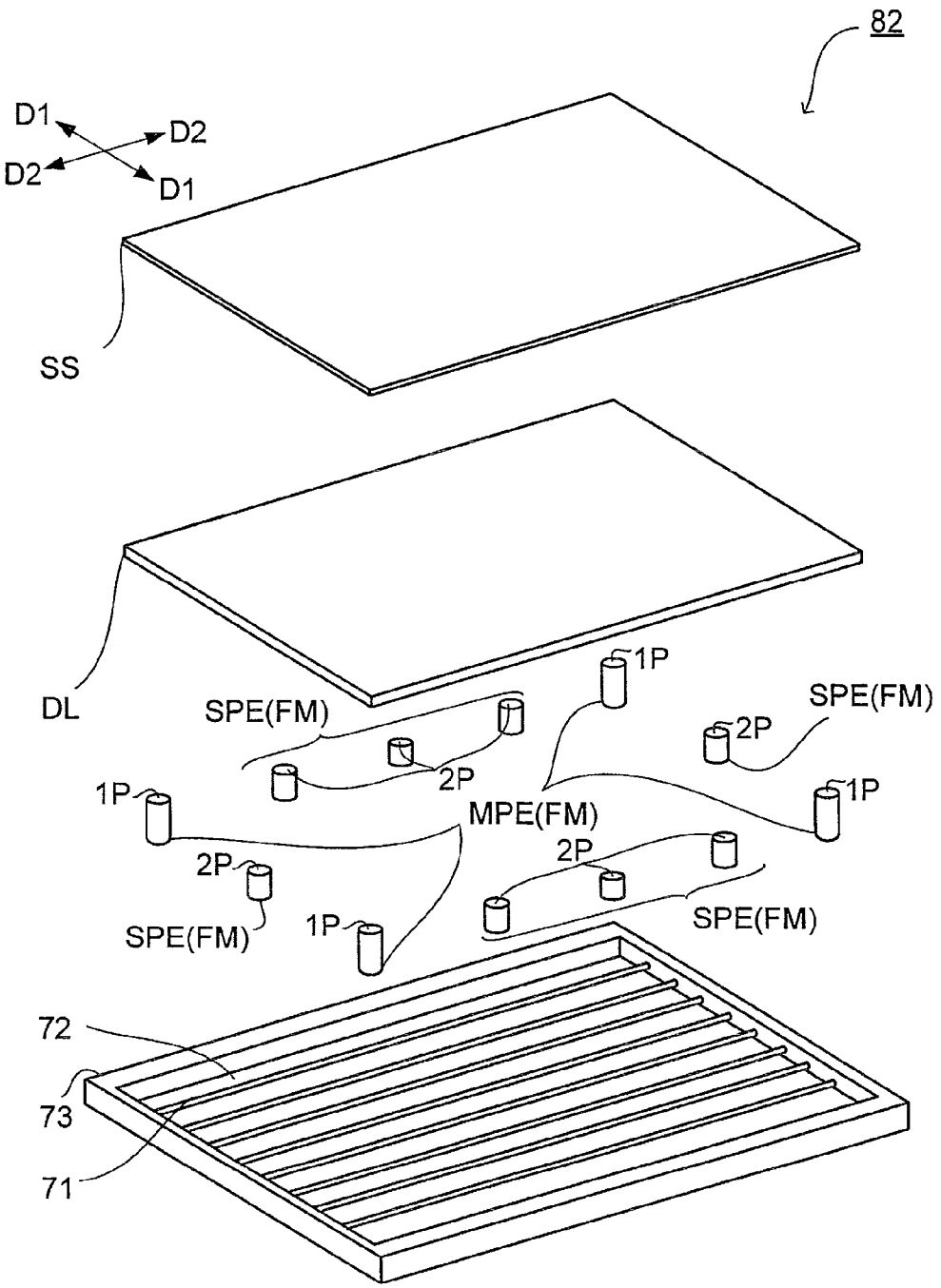
FIG. 10 is an exploded perspective view of another example (an example 4) of the backlight units shown in FIGS. 1, 4 and 7.
Figure 11:
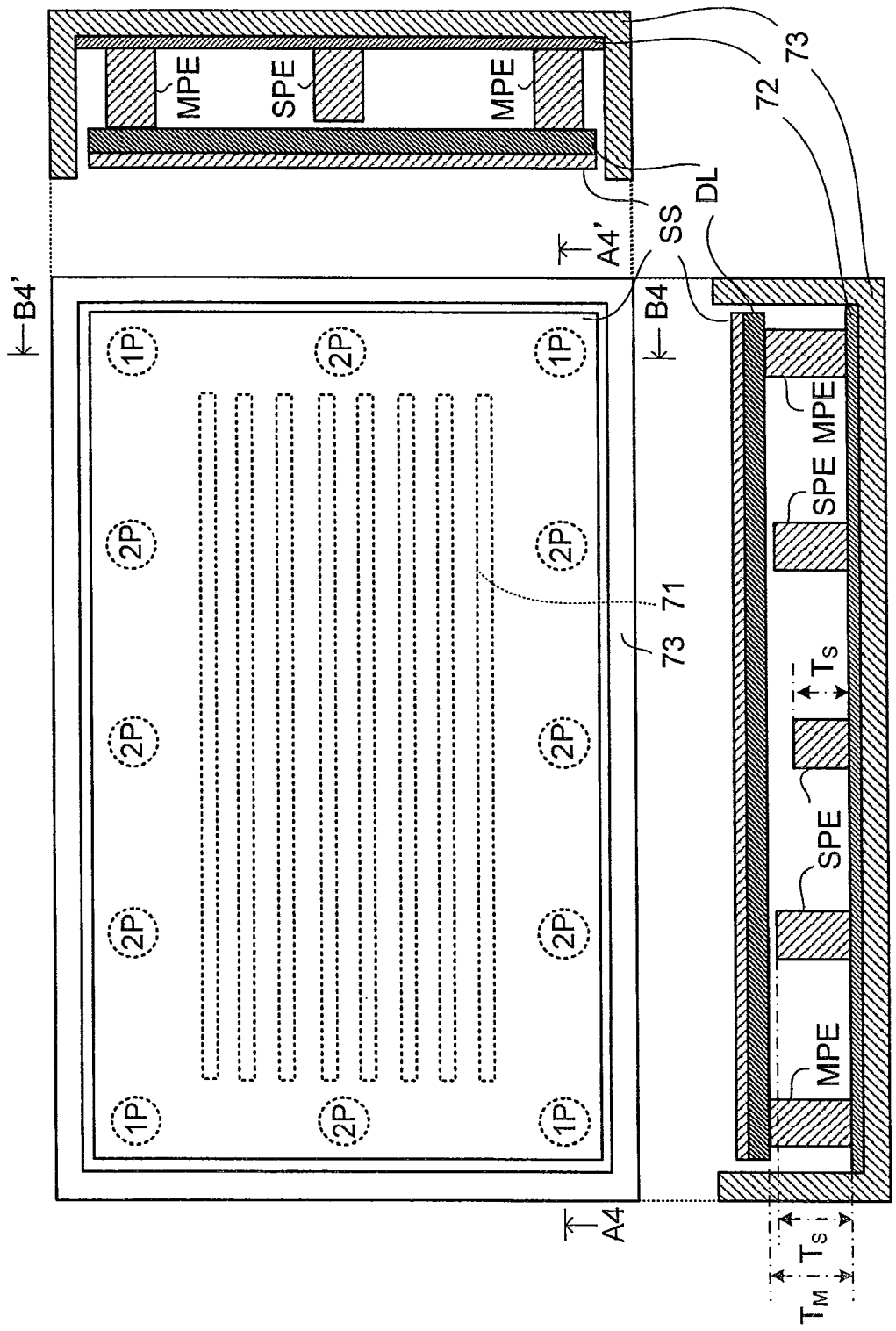
FIG. 11 is a three-surface view of FIG. 10 and shows a plan view, a sectional view taken along the A4-A4' line and seen in the A4-A4' arrow direction, and a sectional view taken along the B4-B4' line and seen in the B4-B4' arrow direction.
Figure 12:
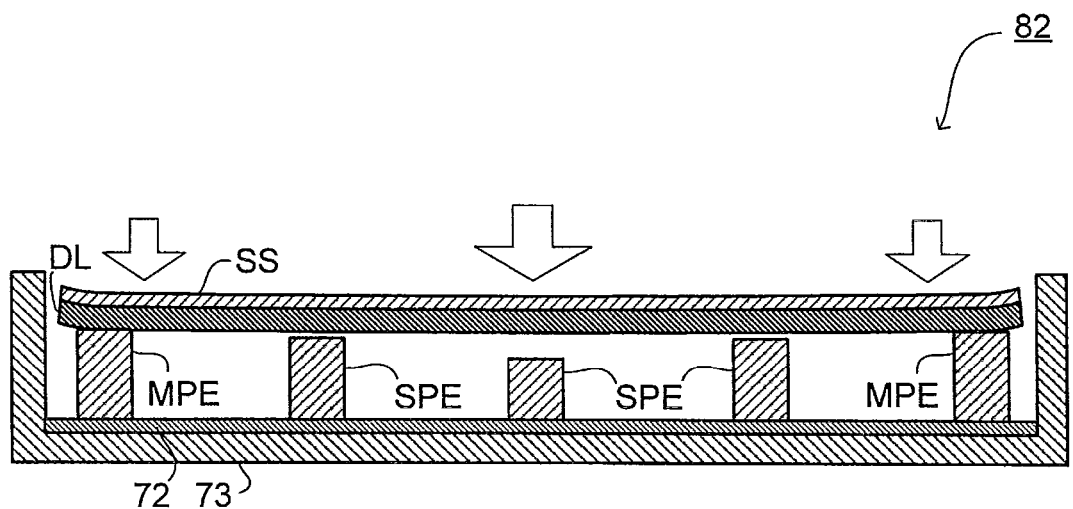
FIG. 12 is a sectional view taken along the A4-A4' line and seen in the A4-A4' arrow direction in a case where a diffusion plate of the backlight unit is bent.
Figure 13:
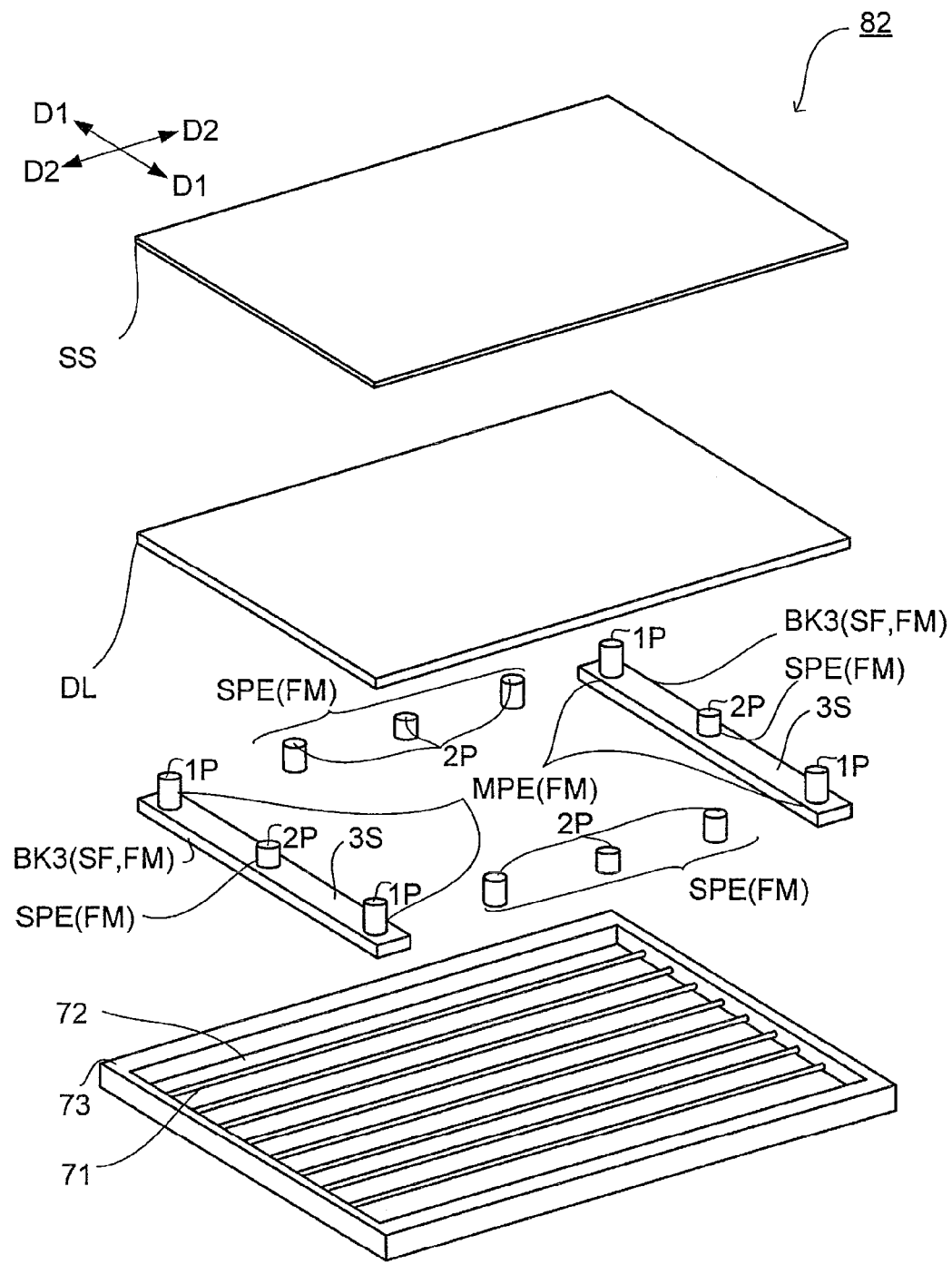
FIG. 13 is an exploded perspective view of another example (an example 5) of the backlight units shown in FIGS. 1, 4, 7 and 10.
Figure 14:
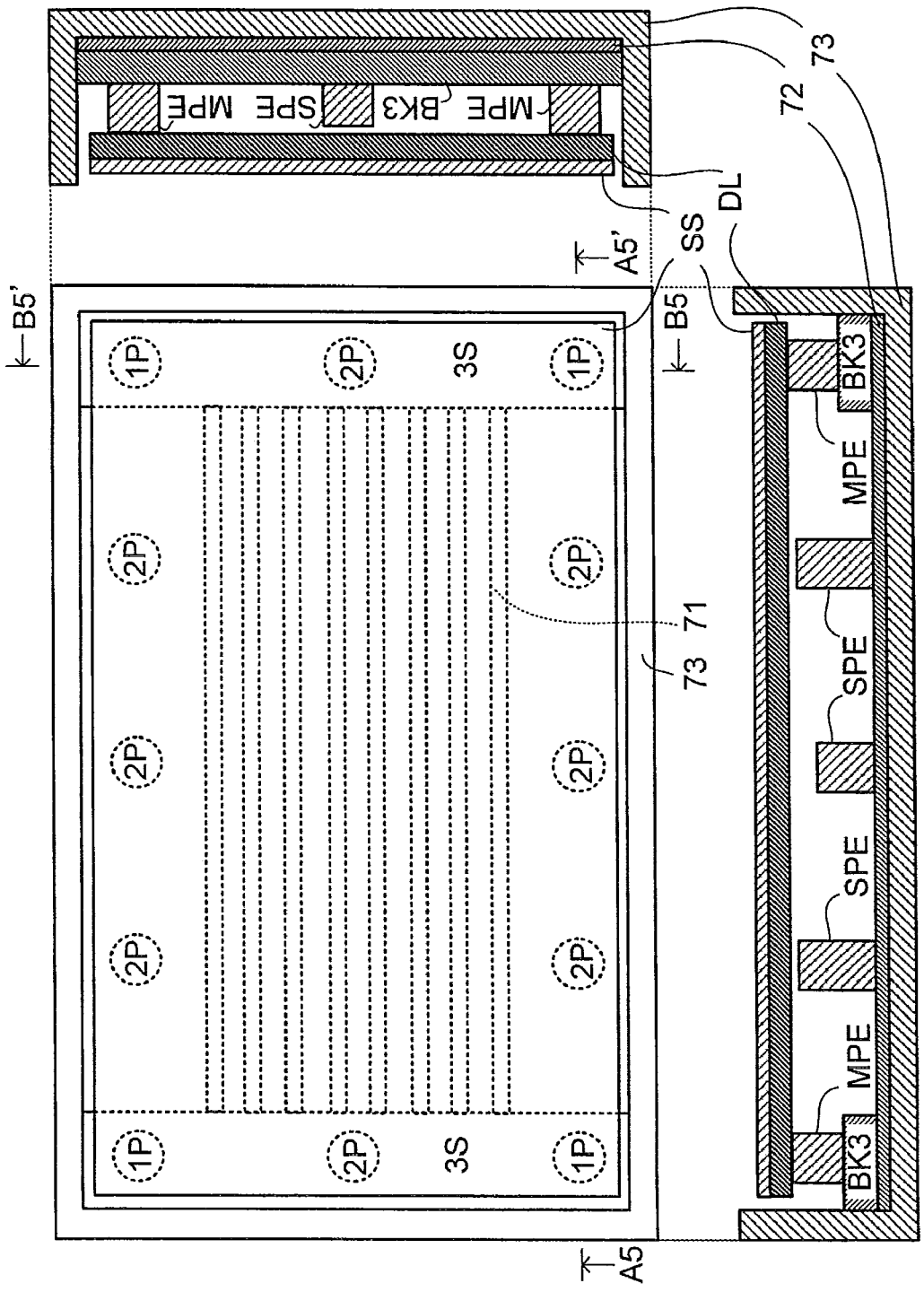
FIG. 14 is a three-surface view of FIG. 13 and shows a plan view, a sectional view taken along the A5-A5' line and seen in the A5-A5' arrow direction, and a sectional view taken along the B5-B5' line and seen in the B5-B5' arrow direction.
Figure 15:
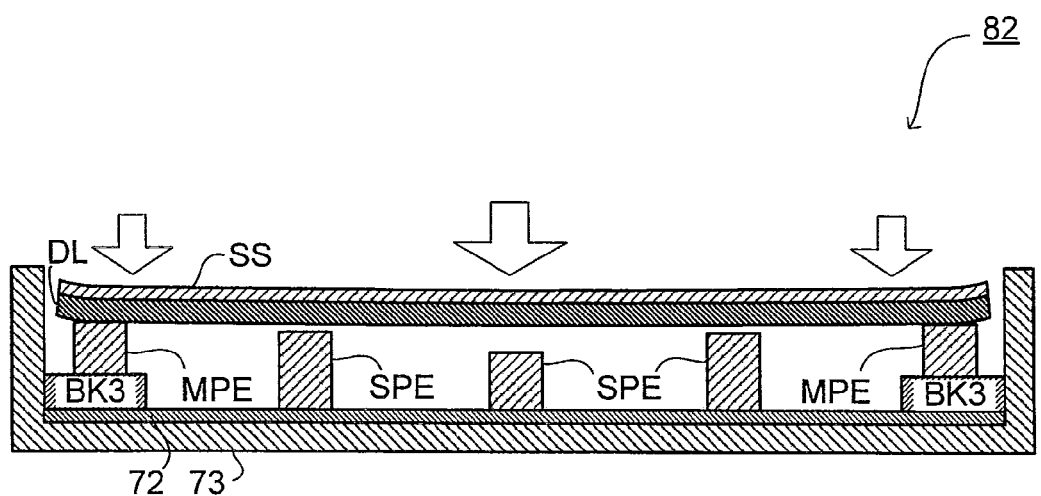
FIG. 15 is a sectional view taken along the A5-A5' line and seen in the A5-A5' arrow direction in a case where a diffusion plate of the backlight unit is bent.
Figure 16:
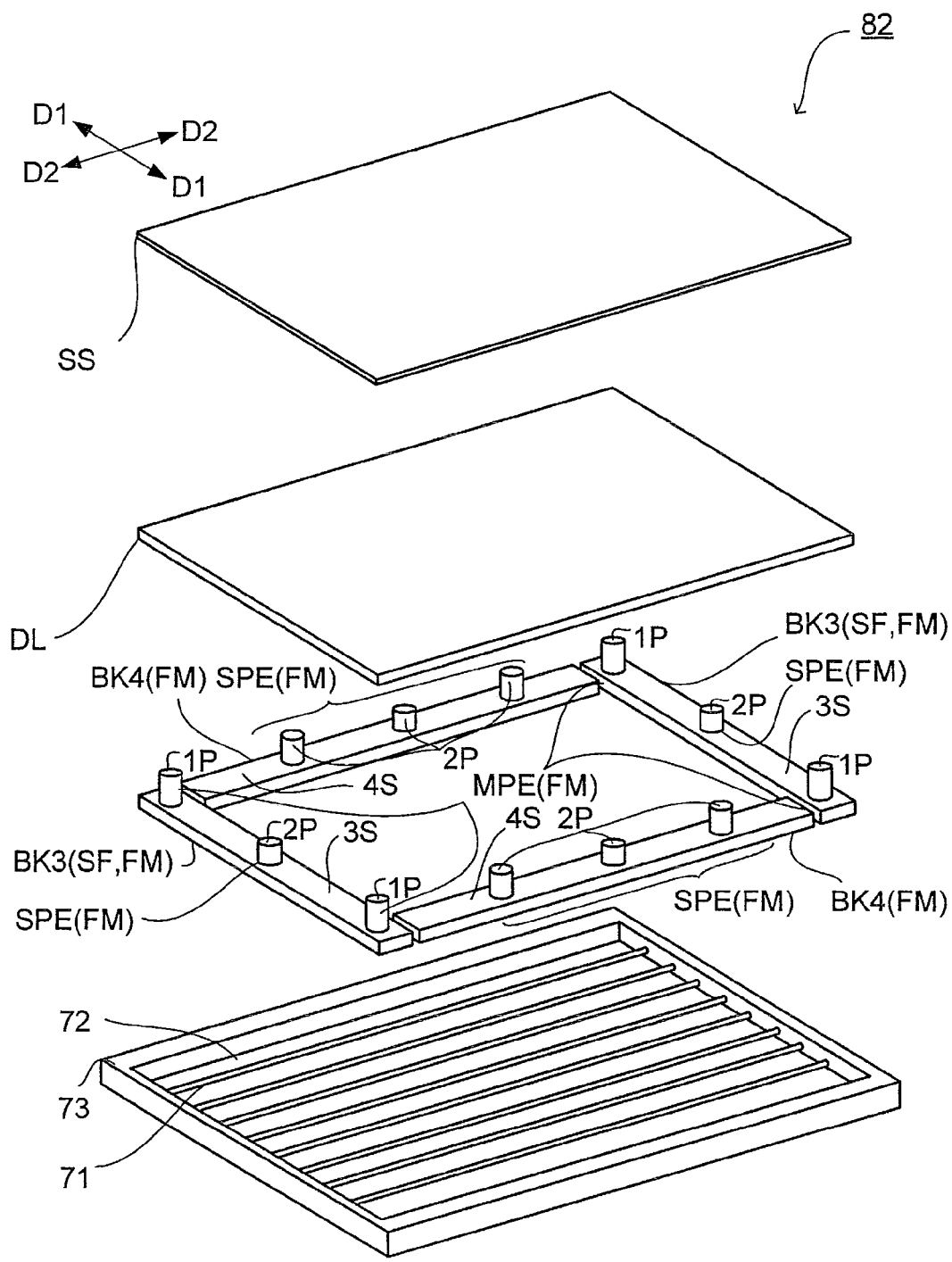
FIG. 16 is an exploded perspective view of another example (an example 6) of the backlight units shown in FIGS. 1, 4, 7, 10 and 13.

FIGS. 10 to 12, 13 to 15, and 16 to 18 show backlight units 82 in the examples 4 to 6, respectively. FIGS. 10, 13 and 16 are illustrated in the same way as FIG. 1, FIGS. 11, 14 and 17 are illustrated in the same way as FIG. 2, and FIGS. 12, 15 and 18 are illustrated in the same way as FIG. 3.

In the backlight unit 82 according to the example 4 shown in FIGS. 10 to 12, the fluorescent lamps 71 is supported by only the support pin base 74 (see FIG. 25), not shown. In other words, in the backlight unit 82 according to the example 4, a side holder for holding both ends of the fluorescent lamp 71 is not incorporated. Accordingly, in this backlight unit 82, the diffusion plate DL is supported by columns PE circularly arranged in a plane (Accordingly, the column PE is able to be called the support frame FM). In detail, the columns PE include two kinds of components, that is, a main column MPE and a sub-column SPE.

The main column MPE is a column that supports the diffusion plate DL by always making one surface 1P which has a smaller area than the support surface 1S of the first block BK1 come in contact with the diffusion plate DL, and is so formed as to be upright from the backlight chassis 73 (in detail, from the reflection sheet 72 located on the bottom portion 73a of the backlight chassis 73). Accordingly, the contact area between the main column MPE and the diffusion plate DL becomes smaller than the contact area between the first block BK1 and the diffusion plate DL, thereby curbing generation of a squeak sound.

In the backlight unit 82 according to the example 4, although the main columns MPE come into contact with the four corners (both ends of each of the shorter sides of the diffusion plate DL) of the rectangular diffusion plate DL, this is not limitation. Because the main columns MPE support the diffusion plate DL by coming into contact with the diffusion plate DL, it is desirable that more main columns MPE are used. However, it can also be said that at least three main columns MPE need only to be arranged circularly so as to stably support a surface-shaped member like the diffusion plate DL.

The sub-columns SPE is a column that does not come into contact with the diffusion plate DL. However, the sub-column SPE prevents the diffusion plate DL from being excessively bent toward the reflection sheet 72. In other words, the sub-column SPE is the column PE that supports the diffusion plate DL only if the diffusion plate DL is excessively bent. For this purpose, the sub-column SPE is shorter than the main column MPE (the length $T_S$ of the sub-column SPE<the length $T_M$ of the main column MPE; conditional formula B), so that the sub-columns SPE do not come into contact with the diffusion plate DL that is bent in an expected range. Like the main column MPE, the sub-column SPE is so formed as to be upright from the backlight chassis 73.

A bend of the diffusion plate DL is generated by deformation of other places with respect to the place supported by the main column MPE (In other words, places that are nor supported by the main column MPE are easily bent). Accordingly, it is desirable that the sub-columns SPE are located between the adjacent main columns MPE, MPE as in the backlight unit 82 according to the example 4. In other words, the sub-columns SPE need only to be located between the circularly adjacent main columns MPE, MPE.

If the diffusion plate DL is bent with respect to the place where the diffusion plate DL is supported by the main column MPE, usually the bend amount of the diffusion plate DL corresponding to the central portion between the main columns MPE, MPE becomes largest, and gradually decreases from the central portion to the main column MPE (Here, the bend amount is a change amount in the position of the diffusion plate DL before and after a bend.)

Accordingly, it is desirable that the length of the sub-column SPE gradually decreases from the main column MPE to the center point between the main columns MPE, MPE. From this reason, for example, in the backlight unit 82 according to the example 4, the length $T_S$ of the sub-column SPE corresponding to the central portion between the main columns MPE, MPE along the longer side of the diffusion plate DL is made shorter than the lengths $T_S$ of the sub-columns SPE located from the place near the central portion between the main columns MPE, MPE to the main column MPE.

Accordingly, both of the part of the diffusion plate DL that corresponds to the central portion between the main columns MPE, MPE and has a relatively large bend amount and the part of the diffusion plate DL that corresponds to the place near the main column MPE and has a relatively small bend amount do not come into contact with the sub-columns SPE. Besides, it becomes hard for foreign matter to invade from between the main columns MPE, MPE.

As described above, as an example of the case where the part of the diffusion plate DL corresponding to the center portion between the main columns MPE, MPE is easily bent, there is a case where in the diffusion plate DL that has a shape (e.g., a rectangular shape) the longer and shorter sides of which are able to be defined, the main columns MPE are located corresponding to the two opposite shorter sides of the outer edge of the diffusion plate DL. Accordingly, in such a case, it is desirable that the sub-columns SPE are located corresponding to the two opposite longer sides of the outer edge of the diffusion plate DL.

In the meanwhile, in the backlight unit 82 according to the embodiment 4, the fluorescent lamp 71 is supported by only the support pin base 74 (see FIG. 25). If it is desired to support the fluorescent lamp 71 more stably than in such backlight unit 82, a backlight unit such as the backlight unit 82 in the embodiment 5 is able to be used.

In the backlight unit 82 according to the example 5 shown in FIGS. 13 to 15, third blocks BK3, BK3 that play the role of the side holder SF are located at both ends of the fluorescent lamps 71. Accordingly, the third blocks BK3 are so located as to face the two opposite shorter sides of the outer edge of the diffusion plate DL. Besides, in this backlight unit 82, the main columns MPE are so disposed as to be upright on one surface (one surface 3S that faces the diffusion plate DL) of the third block BK3.

In other words, the backlight unit 82 according to the example 5 incorporates a unitary component of the third block BK3 and the main columns MPE, and the sub-columns SPE as the support frame FM. Accordingly, the support frame FM stably holds the fluorescent lamps 71 with the third blocks BK3, while the diffusion plate DL also is able to be supported by the main columns MPE.

Figure 17:
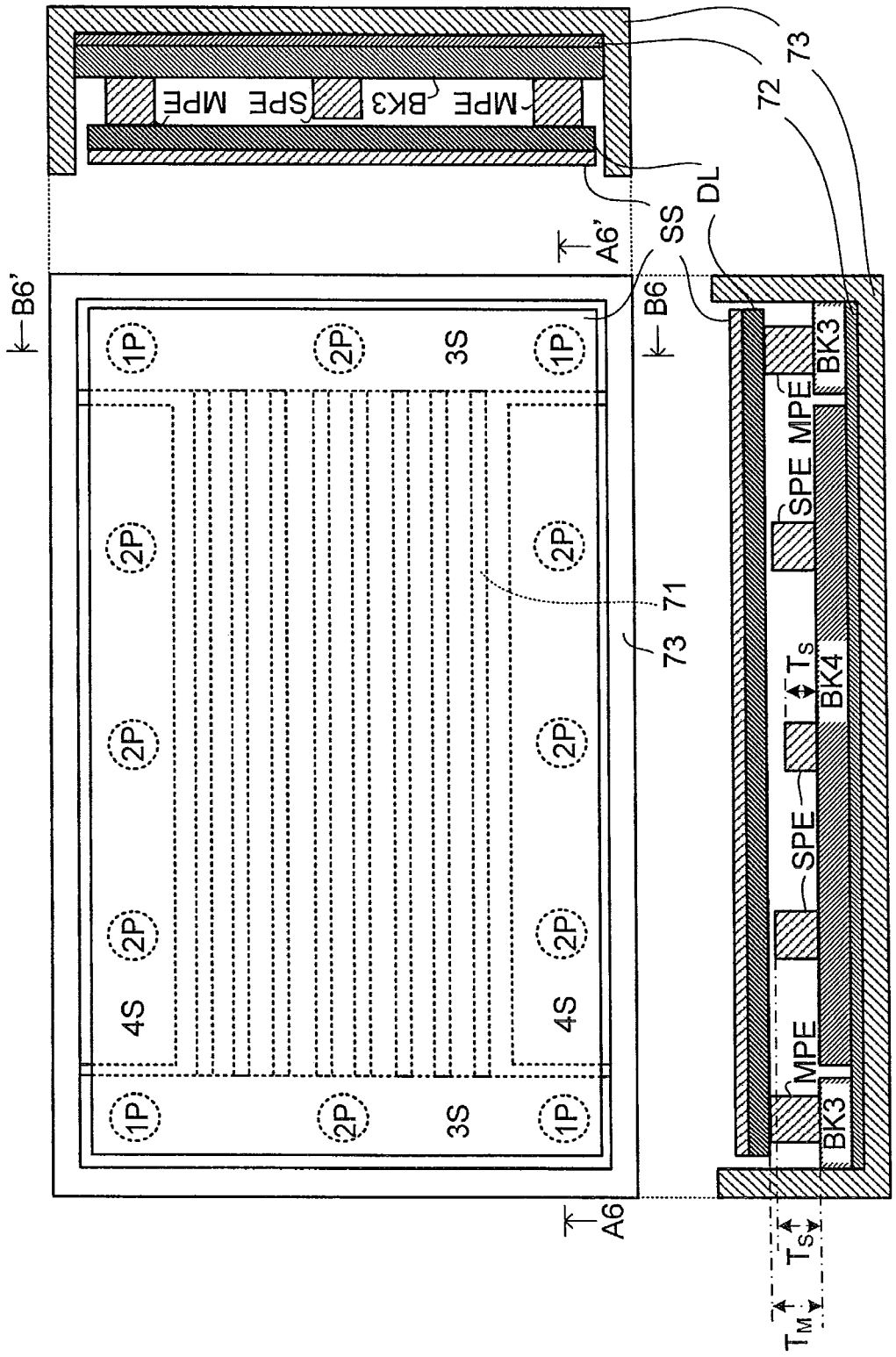
FIG. 17 is a three-surface view of FIG. 16 and shows a plan view, a sectional view taken along the A6-A6' line and seen in the A6-A6' arrow direction, and a sectional view taken along the B6-B6' line and seen in the B6-B6' arrow direction.
Figure 18:
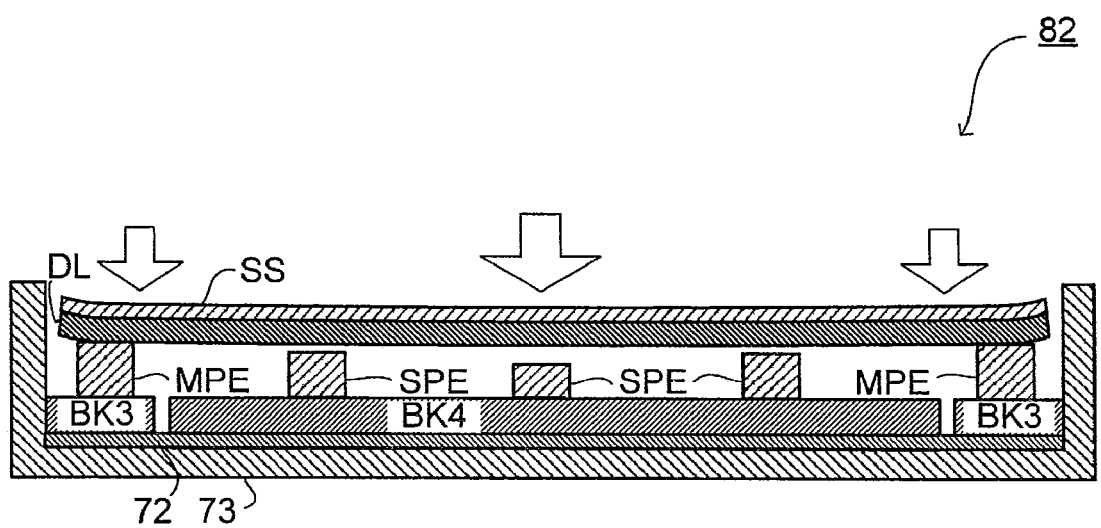
FIG. 18 is a sectional view taken along the A6-A6' line and seen in the A6-A6' arrow direction in a case where a diffusion plate of the backlight unit is bent.

In the backlight unit 82 according to the example 6 shown in FIGS. 16 to 18, blocks BK (fourth blocks BK4) that face the two opposite longer sides of the outer edge of the diffusion plate DL are disposed, and the sub-columns SPE are so disposed as to be upright on one surface (one surface 4S that faces the diffusion plate DL) of the fourth block BK4. In other words, the backlight unit 82 according to the example 6 incorporates, as the support frame FM, a unitary component of the third block BK3 and the main columns MPE and a unitary component of the fourth blocks BK4 and the sub-columns SPE.

Accordingly, the support frame FM stably holds the fluorescent lamps 71 with the third blocks BK3, supports the diffusion plate DL with the main columns MPE, and further, prevents foreign matter from invading through between the third blocks BK3, BK3 (between one end of one of the third opposite blocks BK3 and one end of the other of the third opposite blocks BK3) with the sub-columns SPE and the fourth blocks BK4.

Here, the sub-columns SPE disposed on the fourth blocks BK4 have lengths so as not to come into contact with the diffusion plate DL that is bent in an expected range. Besides, as described above, it is desirable that the length $T_S$ of the sub-column SPE corresponding to the central portion between the main columns MPE, MPE along the longer side of the diffusion plate DL is made shorter than the lengths $T_S$ of the sub-columns SPE located from the place near the central portion between the main columns MPE, MPE to the main column MPE (see FIG. 17).

Figure 19A:
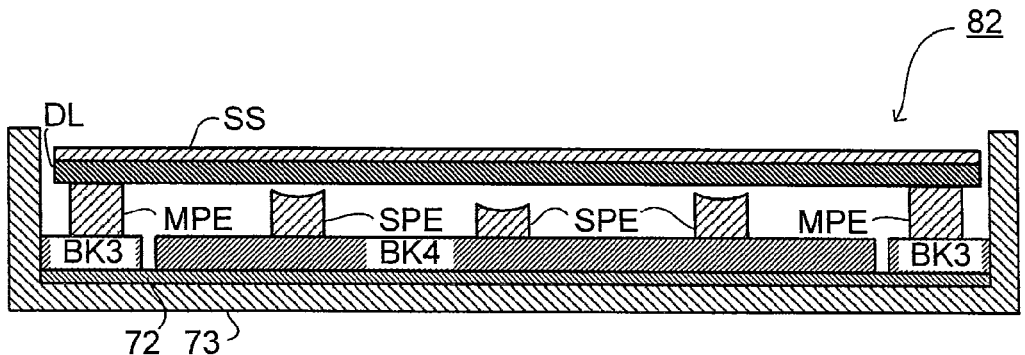
FIG. 19A is another example of the sectional view taken along the A6-A6' line and seen in the A6-A6' arrow direction of the backlight unit shown in FIG. 17 that includes different sub-columns.
Figure 19B:
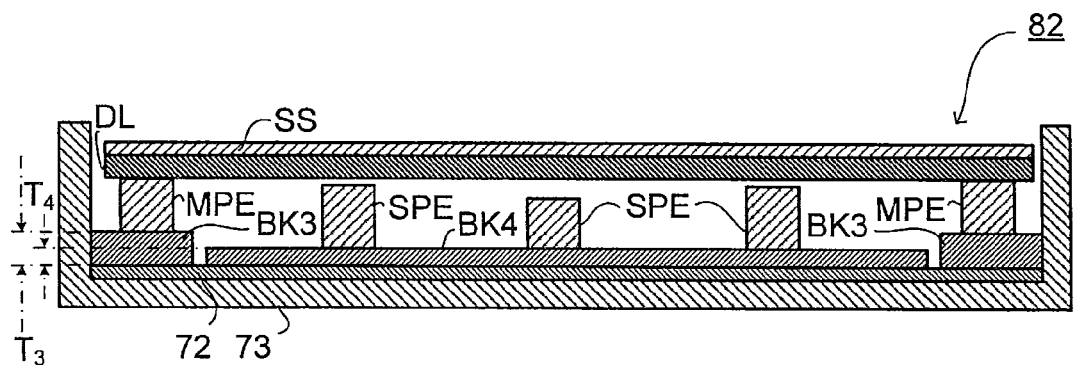
FIG. 19B is another example of the sectional view taken along the A6-A6' line and seen in the A6-A6' arrow direction of the backlight unit shown in FIG. 17 that includes a fourth block which has a different thickness.

As shown in FIG. 19A, one surface (an opposite end surface 2P; see FIG. 17) of the sub-column SPE that faces the diffusion plate DL may be so concaved as not to come into contact with the diffusion plate DL. Besides, it is desirable that a thickness relationship between the third block BK3 corresponding to the shorter side of the diffusion plate DL and the fourth block BK4 corresponding to the longer side of the diffusion plate DL meets the following conditional formula C [the conditional formula (2)] (see FIG. 19B):

$$T_3 > T_4 \qquad \text{conditional formula C}$$

where $T_3$: thickness of the third block BK3 along the thickness direction of the diffusion plate DL $T_4$: thickness of the fourth block BK4 along the thickness direction of the diffusion plate DL The thickness $T_3$ of the third block BK3 must have a constant thickness so as to hold the fluorescent lamps 71. On the other hand, because the fourth block BK4 does not hold the fluorescent lamps 71, the degree of freedom of the thickness $T_4$ of the fourth block Bk4 is high. Accordingly, from the viewpoint of cost reduction, it is desirable that the thickness $T_4$ of the fourth block BK4 is thinner than the thickness $T_3$ of the third block BK3.

Figure 19C:
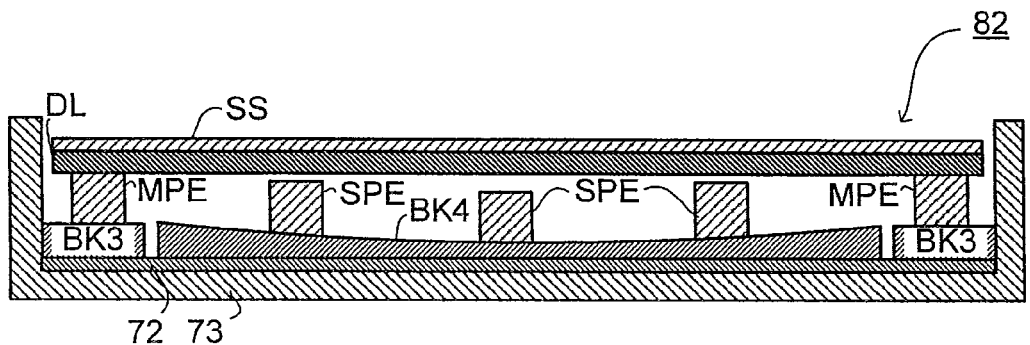
FIG. 19C is another example of the sectional view taken along the A6-A6' line and seen in the A6-A6' arrow direction of the backlight unit shown in FIG. 17 that includes a fourth block which has a different shape.

As shown in FIG. 19C, the one surface 4S of the fourth block BK4 on which the sub-columns SPE are disposed may be concaved. In detail, the fourth block BK4 is concaved deepest at the center of the longer side thereof and the concave amount decreases from the center to the end of the longer side, so that the one surface 4S of the fourth block BK may be concaved into a curved surface.

Accordingly, even when the sub-columns SPE have the same length, if the sub-columns SPE are spaced apart from each other on the concaved surface 4S of the fourth block BK4, the distances from the tip ends (the opposite end surfaces 2P) of the sub-columns SPE to the bottom portion of the fourth block BK4 change.

In other words, at the sub-column SPE located at the most deeply concaved center portion of the longer side of the fourth block BK4 and at the sub-columns SPE located at the other positions of the longer side of the fourth block BK4, the distances from the tip ends of the sub-columns SPE to the bottom of the fourth block BK4 change. Accordingly, the backlight unit 82 is able to achieve the arrangement of the sub-columns SPE with the same-length sub-columns SPE considering the bend amount of the diffusion plate DL.

The concave portion may be formed not only on the one surface 4S of the fourth block BK4 but also on the one surface 3S of the third block BK3 on which the main columns MPE are located (the third block BK3 is concaved deepest at the center of the longer side thereof and the concave amount decreases from the center to the end of the longer side, so that the one surface 3S may be concaved into a curved surface).

According to the concaved surface, even when the main columns MPE have the same length, if the main columns MPE are spaced apart from each other on the concaved surface 3S of the third block BK3, the distances from the tip ends of the main columns MPE to the bottom portion of the third block BK3 change. Because of this, the backlight unit 82 is able to relatively reduce the contact area between the shorter sides of the diffusion plate DL and the main columns MPE and lower a squeak sound that depends on the contact area by disposing some of the plurality of main columns MPE so as to be away from the diffusion plate DL.

Accordingly, if both of the one surface 4S of the fourth block BK4 and the one surface 3S of the third block BK3 are concaved, it is possible to prevent a squeak sound from being generated most effectively. However, even if at least one of the one surface 3S of the third block BK3 and the one surface 4S of the fourth block BK4 is concaved, the effect of reducing a squeak sound is obtained.

Embodiment 3

An embodiment 3 is explained. Here, members that have the same functions as those used in the embodiments 1 and 2 are indicated by the same reference numbers and the explanation of them is skipped.

In the embodiments 1 and 2, the diffusion plate DL is described as the member (the diffusion member) that has a function to disperse and diffuse light. However, the diffusion member incorporated in the backlight unit 82 is not limited to the diffusion plate DL.

Figure 20:
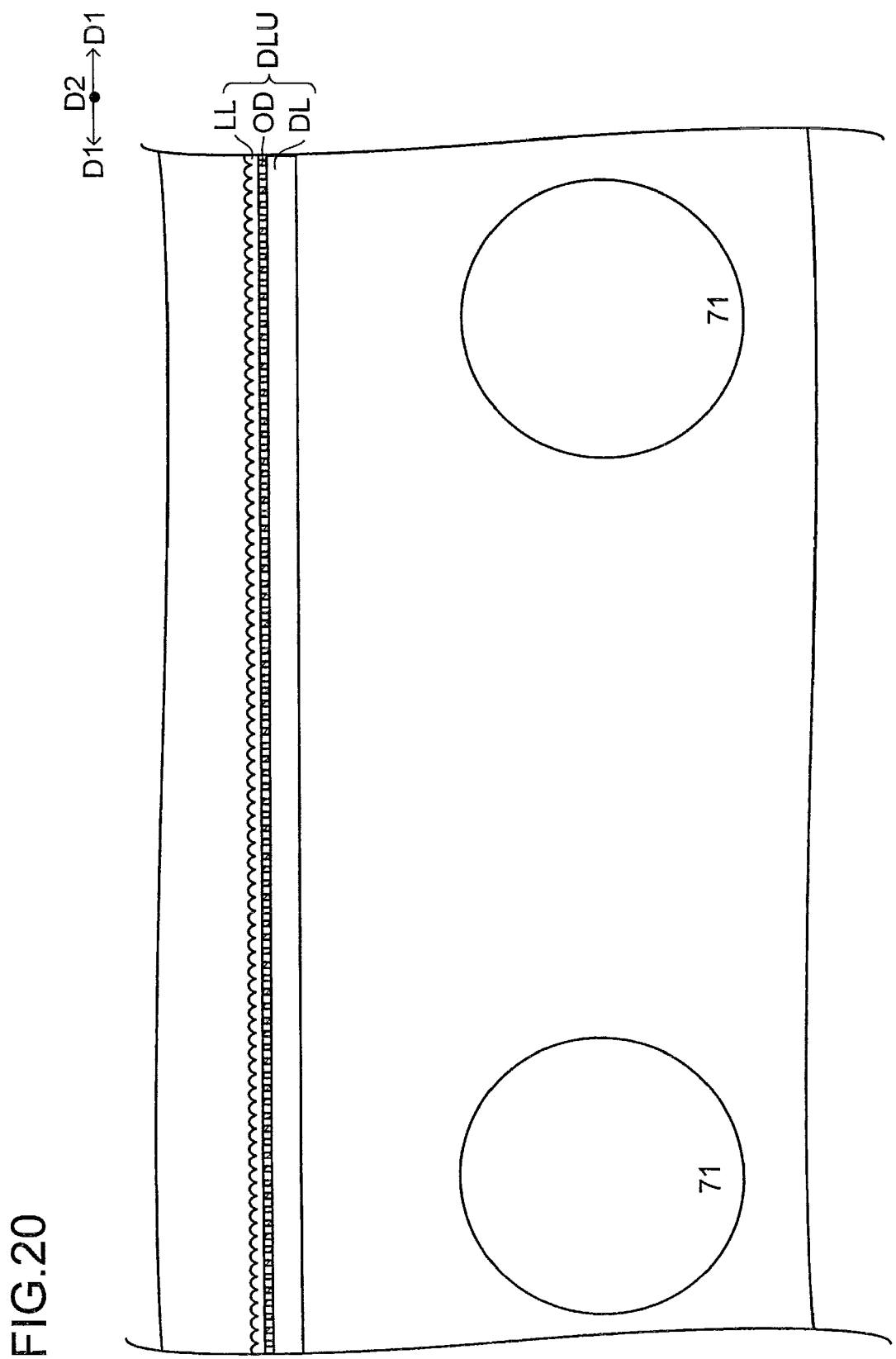
FIG. 20 is a sectional view showing a diffusion unit.
Figure 21:
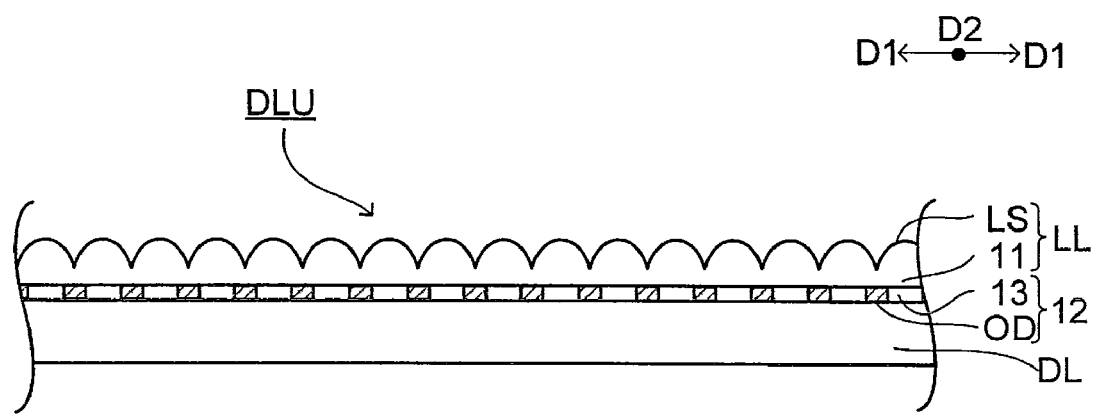
FIG. 21 is an enlarged sectional view of FIG. 20.

For example, a diffusion unit DLU shown in FIGS. 20 and 21 (an enlarged view of FIG. 20) may be incorporated in the backlight unit 82. The diffusion unit DLU includes the diffusion plate DL, a lenticular lens layer LL, and an optical member OD.

Here, the diffusion unit DLU is described in detail. Like in the embodiments 1 and 2, the diffusion plate DL of the diffusion unit DLU is formed of a resin such as polycarbonate or methyl methacrylate-styrene that have a function to disperse light.

On the other hand, the lenticular lens layer LL is formed of polyethylene terephthalate or the like, and includes a surface-shaped supporter 11 and a plurality of cylindrical lenses (lenticular lenses) LS (see FIG. 21). The plurality of cylindrical lenses LS are arranged on the supporter 11 in parallel with each other. The arrangement direction of the cylindrical lenses LS is the same as the first direction D1 that is the arrangement direction of the fluorescent lamps 71. Besides, the longitudinal direction of the cylindrical lens LS is the same as the second direction D2 that is the longitudinal direction of the fluorescent lamp 71.

The optical members OD are arranged in a space (a sandwiched layer 12) defined between the diffusion plate DL and the lenticluar lens layer LL that face each other across a gap therebetween. Accordingly, the diffusion plate DL and the lenticular lens layer LL are unitarily bonded to each other with the aid of adhesive force of adhesives attaching to the optical members OD. The optical members OD are each formed into a linear shape (a plate shape or the like) and arranged in parallel to each other via gaps 13 provided in the sandwiched layer 12. The arrangement direction of the optical members OD is the same as the first direction D1 that is the arrangement direction of the cylindrical lenses LS. Besides, the linear direction (the longitudinal direction) of the optical members OD is the same as the second direction D2 that is the longitudinal direction of the cylindrical lenses LS.

Here, the optical members OD need only to include at least a chief component and dispersed particles and the materials of the chief component and the particles are not limited. For example, an acrylic resin is used for the chief component, and titanium oxide is used for the dispersed particles.

The above diffusion unit DLU is easily deformed (bent) by heat like the diffusion plates DL in the embodiments 1 and 2. Besides, like the diffusion plate DL, the bend direction of the diffusion unit DLU is predictable. In addition, like the diffusion plate DL, the rectangular-shaped diffusion unit DLU is easily bent in the longitudinal direction.

Accordingly, it is possible to support the diffusion unit DLU by using the support frames FM described in the embodiments 1 and 2, and the functions and effects described above are also obtained in the backlight unit 82 that incorporates the diffusion unit DLU. Besides, a further effect is also obtained from the difference between the deformation of the lenticular lens layer LL caused by the bend of the diffusion unit DLU and the deformation of the lens sheet SS located on the bent diffusion plate DL in the embodiments 1 and 2. The effect is an improved quality of the backlight.

Figure 22:
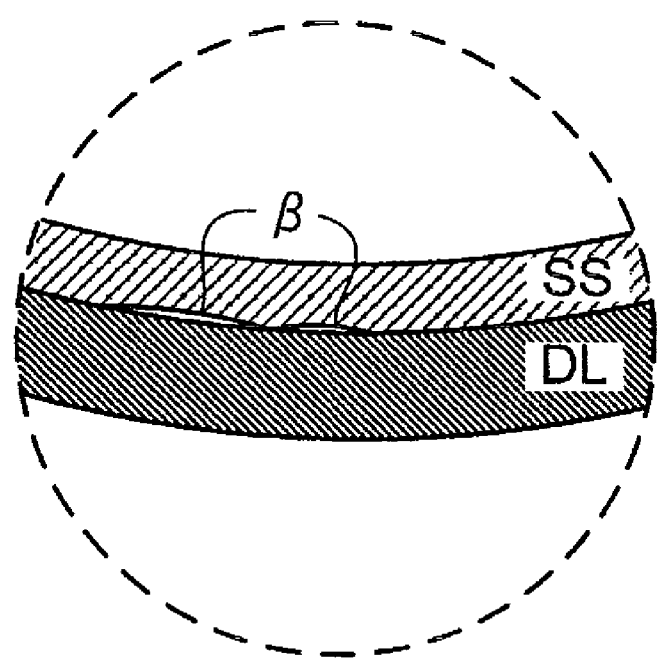
FIG. 22 is an enlarged sectional view of a region as shown in FIG. 3.

The lens sheet SS located on the bent diffusion plate DL in the embodiments 1 and 2 is bent together with the bend of the diffusion plate DL. However, because the lens sheet SS and the diffusion plate DL are not formed unitarily with each other, the lens sheet SS is bent differently from the diffusion plate DL. For example, as shown in FIG. 22 that is an enlarged view of the region α in FIG. 3, the lens sheet SS has places (β) that are bent without coming into tight contact with the diffusion plate DL.

In other words, the way the lens sheet SS is bent is unpredictable and has no regularity. Accordingly, the backlight passing through the lens sheet SS which is bent with no regularity cannot travel in a desired direction and is not high-quality backlight. Also the image quality of the liquid crystal display panel 61 that receives such backlight and functions as a display device does not have a high grade.

On the other hand, the lenticular lens layer LL of the diffusion unit DLU is bent together with the bend of the diffusion plate DL of the diffusion unit DLU. However the lenticular lens layer LL and the diffusion plate DL are formed unitarily with each other. Because of the unitary formation, the lenticular lens layer LL is in tight contact with the diffusion plate DL via the optical members OD and is bent like the diffusion plate DL. Accordingly, the way the lenticular lens layer LL is bent is predictable and has regularity.

Because the backlight unit 82 incorporates the diffusion unit DLU that includes the lenticular lens sheet SS that is bent with regularity, it is possible to design a structure in which the backlight passing through the bent lenticular lens layer LL travels in a desired direction, thereby supplying high-quality backlight. In other words, besides the functions and effects described in the embodiments 1 and 2, this backlight unit 82 is able to supply high-quality backlight. Consequently, the image quality of the liquid crystal display panel 61 that receives the supplied backlight and functions as the display device reaches a high grade.

To sum up, the diffusion unit DLU assumes bend of the lenticular lens layer LL and the diffusion plate DL and has a structure so as not to deteriorate the backlight quality by considering the bend. In other words, the diffusion unit DLU is a member that is allowed to be bent. Accordingly, the backlight unit 82 that incorporates the diffusion unit DLU positively allows the diffusion unit DLU to be bent without considering the backlight quality and avoids contact between the support frame FM and the diffusion unit DLU by using the support frame FM (the support frames FM described in the embodiments 1 and 2) that is variously designed.

On the other hand, as in the backlight unit 82 according to the embodiments 1 and 2, in the arrangement relationship in which the lens sheet SS is disposed on the diffusion plate DL, the diffusion plate DL that is not bent is most desirable so as not to allow bend of the lens sheet SS that easily follow bend of the diffusion plate DL. In other words, unlike the diffusion unit DLU, the diffusion plate DL is a member that is not allowed to be bent.

However, in a case where the diffusion plate DL is easily bent because of the material, the backlight unit 82 allows bend of the diffusion plate DL in order for the diffusion plate DL to be away from the liquid crystal display panel 61, thereby avoiding contact between the lens sheet SS on the diffusion plate DL and the liquid crystal display panel 61 and securing the backlight quality more or less. Further, the backlight unit 82 avoids contact between the support frame FM and the diffusion plate DL by using the support frame FM that is variously designed.

Accordingly, it is most effective in terms of maintenance of the backlight quality and prevention of a squeak sound that the diffusion unit DLU is incorporated in the backlight unit 82 that prevents a squeak sound from being generated with the support frame FM that is variously designed.

Other Embodiments

The present invention is not limited to the above embodiments and it is possible to make various modifications without departing from the spirit of the present invention.

Figure 23:
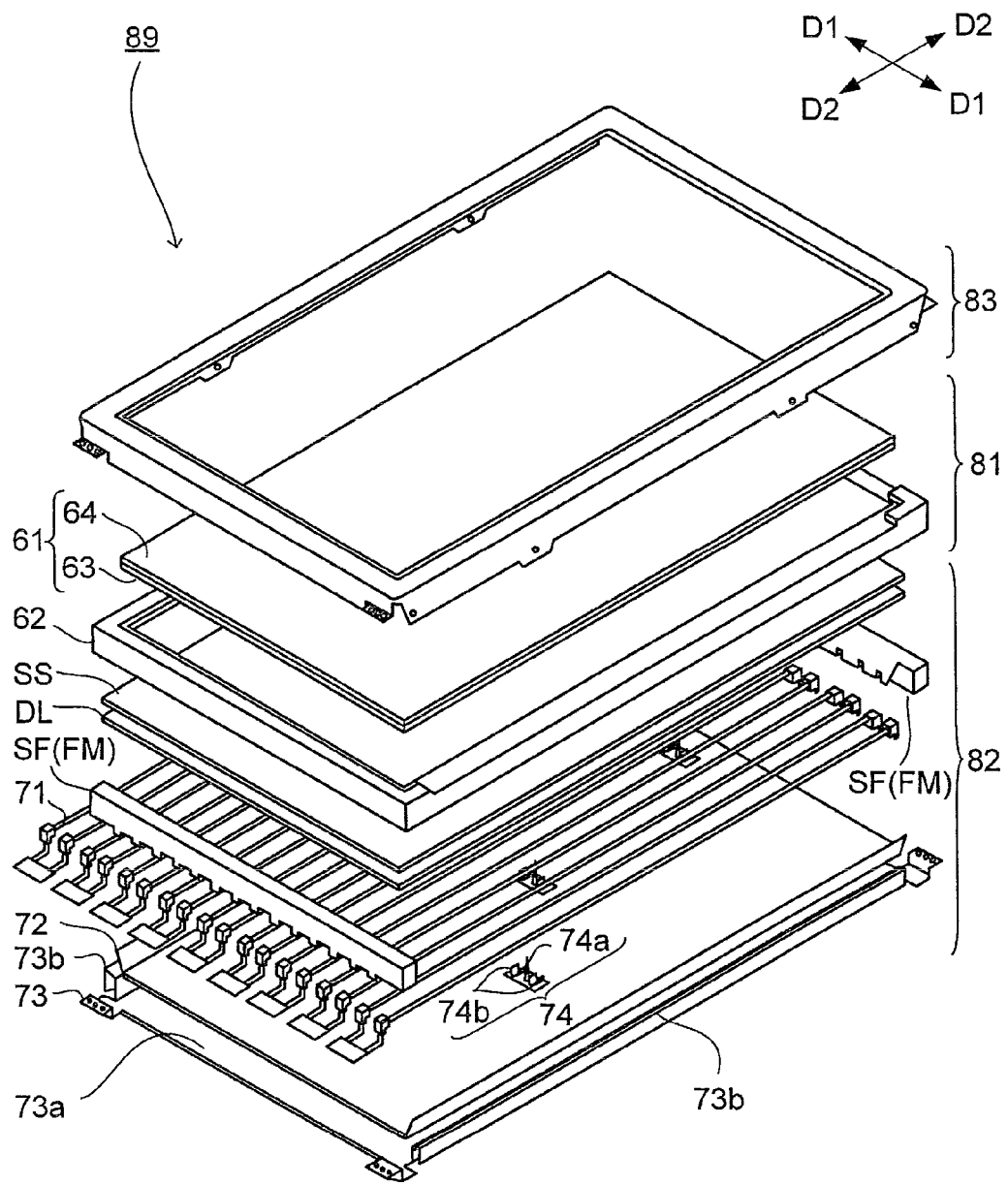
FIG. 23 is an exploded perspective view of another example of a liquid crystal display shown in FIG. 25.

For example, the fist block BK1 and the second block BK2 and the like used as the support frame FM are not limited to the type that is housed in the backlight chassis 73. As an example, as shown in FIG. 23, the backlight unit 82 may be used, which incorporates the backlight chassis 73 that includes the bottom portion 73a covered by the reflection sheet 72, and the wall portions 73b upright from the outside edges of the circumference of the bottom portion 73a along the longitudinal direction of the fluorescent lamp 71. A reason for this is that in this backlight unit 82, for example, only the first block BK1 is housed in the backlight chassis 73, while the wall portions 73b of the backlight chassis 73 play the role of the second block BK2.

Besides, the backlight unit 82 that incorporates the reflection sheet 72 is explained as an example. However, this is not limitation, and it may be a backlight unit 82 that does not incorporate the reflection sheet 72.

Figure 24:
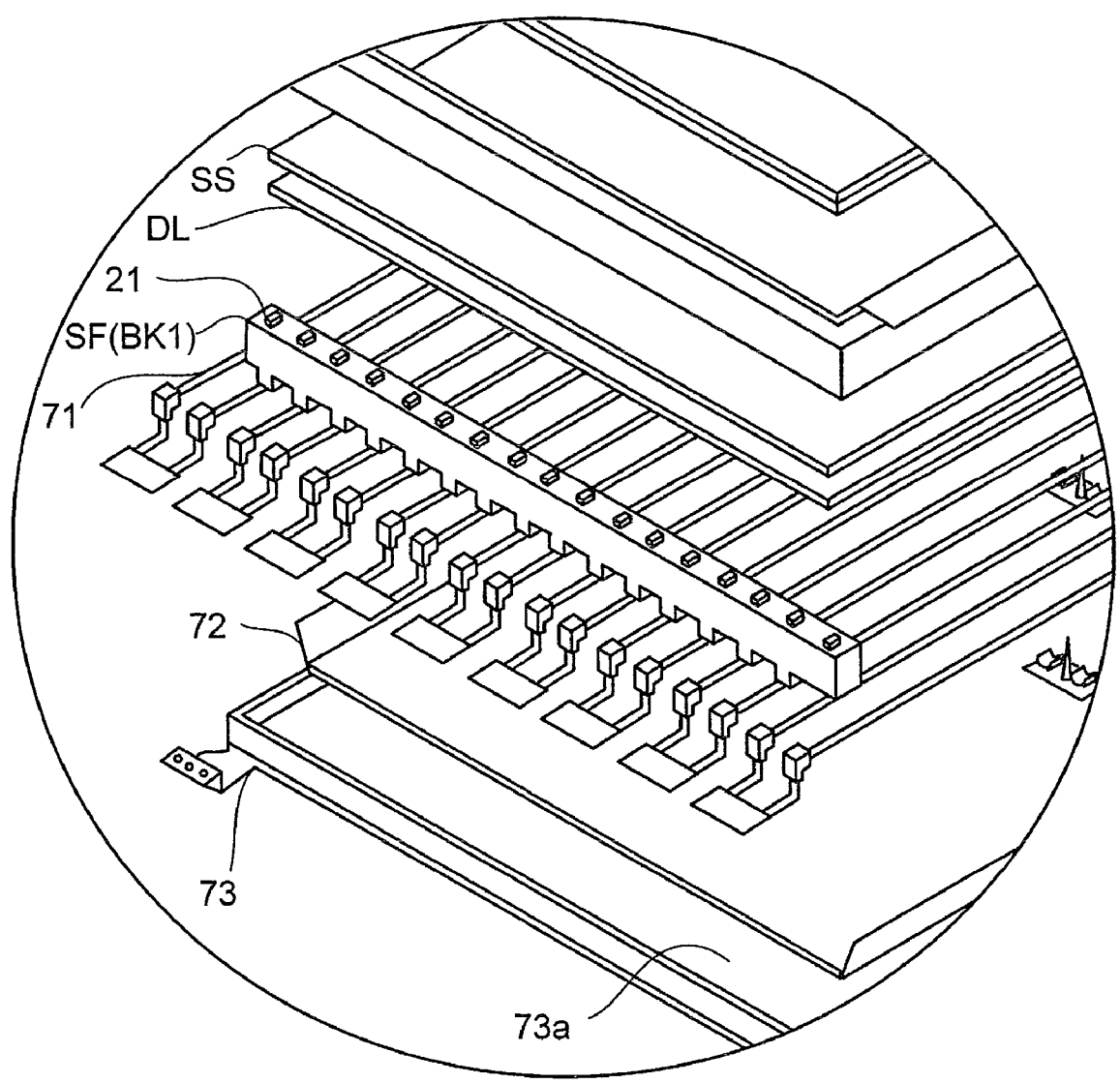
FIG. 24 is an enlarged view showing a rib on a first block.

To reduce the contact area between the diffusion plate DL and the support frame FM, as shown in FIG. 24 (an enlarged view of FIG. 25), ribs 21 may be arranged on the support surface 1S of the first block BK1 and the like. According to this arrangement, the contact area between the ribs 21 and the diffusion plate DL is smaller than the contact area between the first blocks BK1 and the diffusion plate DL, thereby allowing further reduction in a squeak sound. Here, the ribs 21 may be formed not only on the first blocks BK1 but also on the one surface (the one surface facing the diffusion plate DL) of the blocks BK2 to BK4.

It can be said that the chief roles of the second blocks BK2 and the sub-columns SPE change depending on the length of the support pin 74a of the support pin base 74. In detail, in a case where the tip end of the support pin 74a is closer to the diffusion plate DL than the elevation surfaces 2S of the second blocks BK2 and the end surfaces 2P of the sub-columns SPE, the elevation surfaces 2S of the second blocks BK2 and the sub-columns SPE chiefly play a role in preventing foreign matter from invading inside the backlight unit 82. On the other hand, in a case where the tip end of the support pin 74a is more away from the diffusion plate DL than the elevation surfaces 2S of the second blocks BK2 and the end surfaces 2P of the sub-columns SPE, the elevation surfaces 2S of the second blocks BK2 and the sub-columns SPE chiefly play a role in supporting the diffusion plate DL or the diffusion unit DLU.

The invention claimed is:

1. A backlight unit that holds a diffusion member transmitting light from a light source therethrough by supporting the diffusion member with a support frame, wherein
    the diffusion member has longer and shorter sides; and
    the support frame supports only the shorter sides located at two opposite places of an outer edge of the diffusion member, wherein
    the support frame includes: a first block for supporting only two opposite shorter sides of the outer edge of a diffusion member; and a second block facing two opposite longer sides of the outer edge of the diffusion member, and wherein
    the support frame meets the following conditional formula (1) when a thickness of the first block along a thickness direction of the diffusion member is $T_1$, and a thickness of the second block is $T_2$ along a thickness direction of the diffusion member:
    $T_1 > T_2$ conditional formula (1).

2. The backlight unit according to claim 1, wherein at least one of a support surface, that is, a surface of the first block that supports the diffusion member and an elevation surface, that is, a surface of the second block that faces the diffusion member is concaved.

3. The backlight unit according to claim 1, wherein the diffusion member is a diffusion plate for diffusing light from the light source or a diffusion unit that includes a lenticular lens layer disposed on the diffusion plate via an optical member containing dispersed particles.

4. The backlight unit according to claim 1, wherein the diffusion member contains methyl methacrylate-styrene or polycarbonate.

5. A liquid crystal display, comprising:
    the backlight unit according to claim 1; and
    a liquid crystal display panel that receives light from the backlight unit.

6. The backlight unit according to claim 1, wherein a plurality of ribs is provided on an upper surface of the support frame, and the diffusion member is supported by the plurality of ribs.

7. A backlight unit that holds a diffusion member transmitting light from a light source therethrough by supporting the diffusion member with a support frame, comprising:
    a backlight chassis; and
    a support frame, provided independently from the backlight chassis, for supporting the diffusion member, wherein
    the diffusion member has longer and shorter sides; and
    the support frame supports only the longer sides located at two opposite places of an outer edge of the diffusion member.

8. The backlight unit according to claim 7, wherein
    the diffusion member is a diffusion plate for diffusing light from the light source or a diffusion unit that includes a lenticular lens layer disposed on the diffusion plate via an optical member containing dispersed particles.

9. The backlight unit according to claim 7, wherein
    the diffusion member contains methyl methacrylate-styrene or polycarbonate.

10. A liquid crystal display, comprising:
    the backlight unit according to claim 7; and
    a liquid crystal display panel that receives light from the backlight unit.

* * * * *